(12) United States Patent
Son et al.

(10) Patent No.: US 11,451,750 B2
(45) Date of Patent: Sep. 20, 2022

(54) EVENT GENERATION BASED ON USER FEEDBACK BY DOORBELL CAMERA SYSTEM

(71) Applicant: HANWHA TECHWIN CO., LTD., Seongnam-si (KR)

(72) Inventors: Myung-hwa Son, Seongnam-si (KR); Jongho Kim, Seongnam-si (KR); Brian Sung, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 0 days.

(21) Appl. No.: 17/155,189

(22) Filed: Jan. 22, 2021

(65) Prior Publication Data

US 2021/0227184 A1 Jul. 22, 2021

(30) Foreign Application Priority Data

Jan. 22, 2020 (KR) ........................ 10-2020-0008469

(51) Int. Cl.
*H04N 7/18* (2006.01)
*G06V 20/52* (2022.01)
*G06V 40/16* (2022.01)
*G06N 3/04* (2006.01)

(52) U.S. Cl.
CPC ............... *H04N 7/186* (2013.01); *G06N 3/04* (2013.01); *G06V 20/52* (2022.01); *G06V 40/174* (2022.01)

(58) Field of Classification Search
CPC .... G06F 3/0608; G06F 3/0652; G06F 3/0673; G06F 12/023; G06F 12/00; H04N 7/186
See application file for complete search history.

(56) References Cited

U.S. PATENT DOCUMENTS

| 11,151,825 B1* | 10/2021 | Carter ................ G07C 9/00309 |
| 2011/0301433 A1* | 12/2011 | Sadowsky ............. G16H 20/70 600/300 |
| 2013/0155867 A1* | 6/2013 | Asokan ................. H04W 24/06 370/329 |
| 2015/0088625 A1* | 3/2015 | Eronen ............. G06Q 30/0217 705/14.16 |
| 2015/0156031 A1* | 6/2015 | Fadell .................. G08B 29/185 700/90 |
| 2015/0269420 A1* | 9/2015 | Kim ........................ H04L 67/10 382/118 |
| 2018/0352144 A1* | 12/2018 | Miao ..................... G06K 9/6256 |
| 2018/0357870 A1* | 12/2018 | Siminoff .......... G08B 13/19608 |
| 2019/0066471 A1* | 2/2019 | Jeon ................. G08B 13/19613 |
| 2020/0279459 A1* | 9/2020 | Singh ..................... H04N 7/186 |

OTHER PUBLICATIONS

"Deep Residual Learning for Image Recognition" He, 2016, IEEE Conference on Computer Vision and Pattern Recognition (Year: 2016).*

* cited by examiner

*Primary Examiner* — Jared Walker
(74) *Attorney, Agent, or Firm* — Sughrue Mion, PLLC

(57) ABSTRACT

A method for generating an event, which is performed by a doorbell camera system disclosed in the present disclosure may include acquiring video of a visitor, outputting the acquired video of the visitor to a user, learning the user's feedback on the visitor, storing information of the visitor and a learning result of the user's feedback on the visitor, and generating an event based on the information of the visitor and the learning result of the user's feedback.

16 Claims, 20 Drawing Sheets

FIG. 16

```
JSON :
[
 {
  "faceType" : 01)SEE Table 1_
  "faceId" : "afb7d5bf-2040-457f-a9b9-bc042d3a44de",
  "faceRectangle" : {
    "top" : 76,
    "left" : 446,
    "width" : 226,
    "height" : 284
  },
  "faceRetainCount" : 8,
  "faceFACS" : A(SEE FIG. 17)
  "Date" : 20201220-16:45:32.000
 {
 [
```

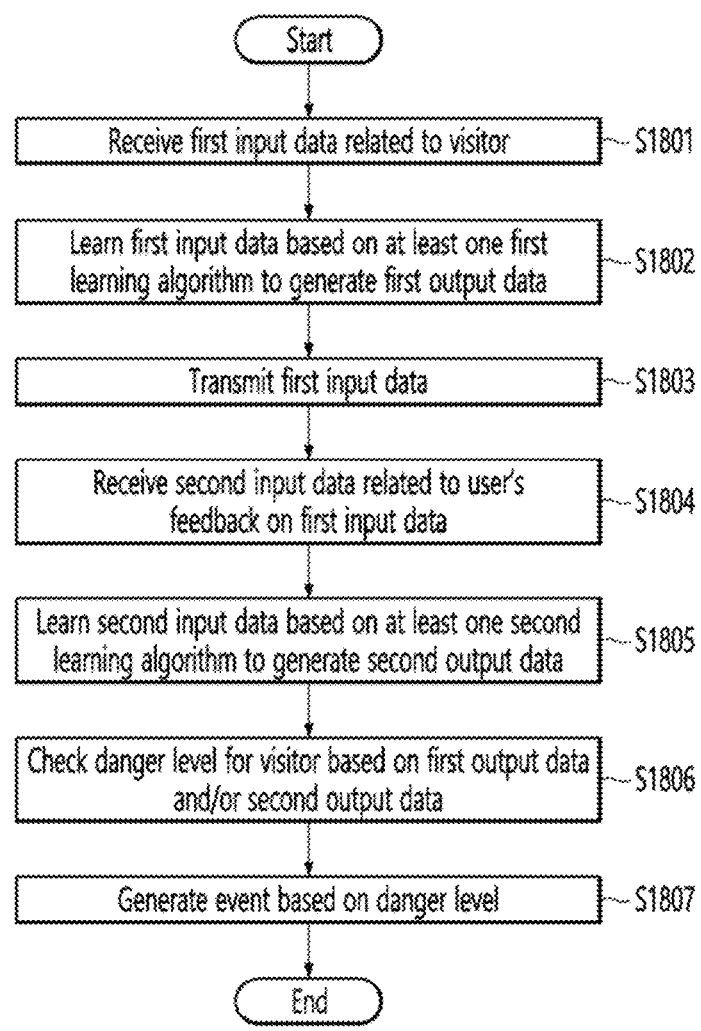

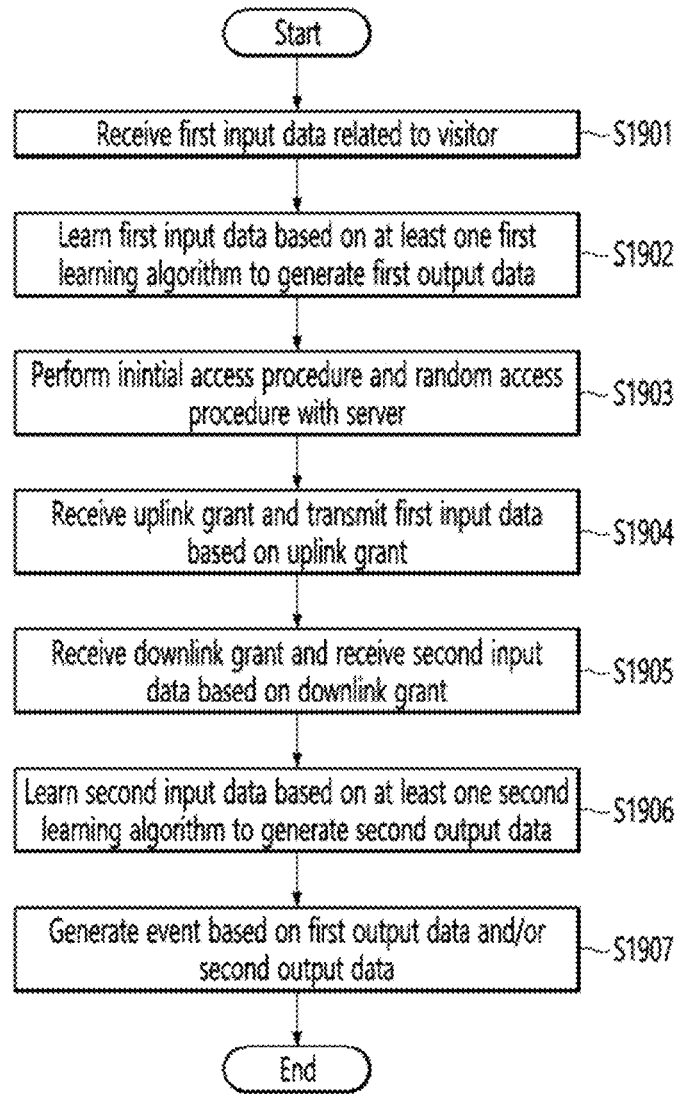

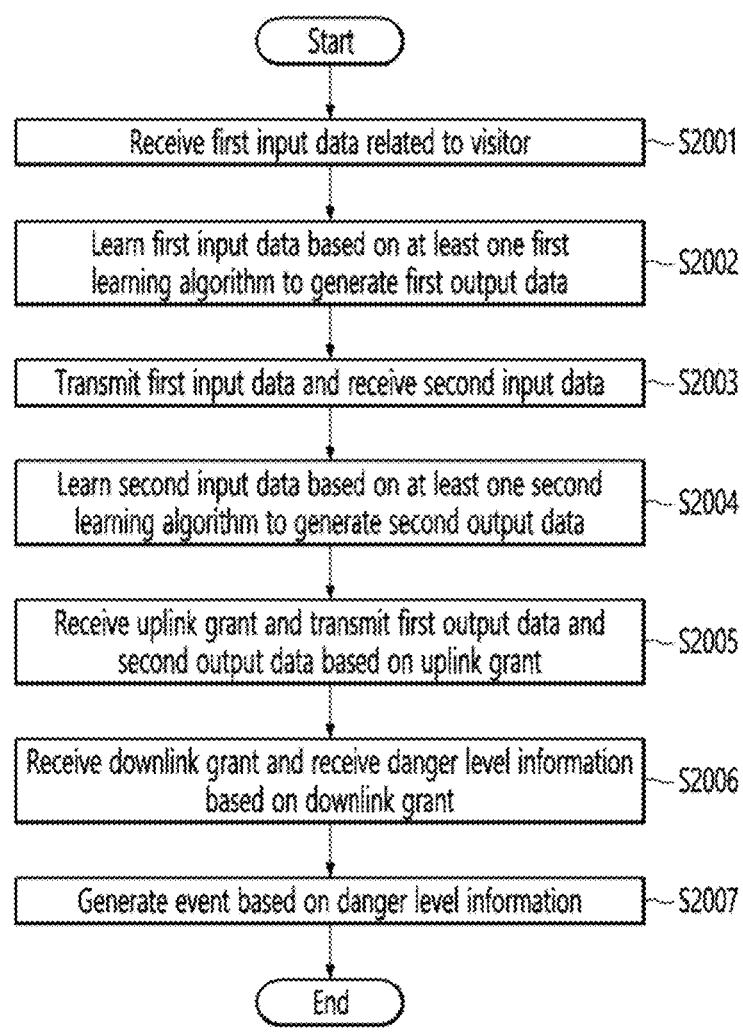

EVENT GENERATION BASED ON USER FEEDBACK BY DOORBELL CAMERA SYSTEM

CROSS-REFERENCE TO RELATED APPLICATION

This application claims priority to Korean Patent Application No. 10-2020-0008469 filed on Jan. 22, 2020 and all the benefits accruing therefrom under 35 U.S.C. § 119, the contents of which are incorporated by reference in their entirety.

BACKGROUND

The present disclosure relates to a doorbell camera system and a method for generating an event by the doorbell camera system.

In general, many doorbell camera devices are installed in entrances of residential facilities, such as houses, apartments, or studio apartments, or offices, or the like. Recent doorbell camera devices have cameras, speakers, microphones, and the like in their main body, and deliver video and audio of visitors outside the house to users inside the house, allowing a user to conveniently check the visitors.

In recent years, as society has become more and more personalized and the number of people living alone is increasing, cases of having to watch out for unfamiliar visitors are increasing. Accordingly, a doorbell camera device is required for a user that has functions for simply providing safer and more convenience the user, as well as a function for monitoring a visitor met through video by a doorbell camera.

SUMMARY

There is an increasing need for functions for proactively making responses by acquiring a variety of information about visitors, as well as simply monitoring visitors through video by a doorbell camera system.

Therefore, the present disclosure is to provide a method capable of making an appropriate response depending on visitors through a doorbell camera system.

Problems to be solved by the present disclosure are not limited to those mentioned above, and other problems not mentioned will be clearly understood by those skilled in the art from the following description.

The present disclosure provides a method for generating an event, which is performed by a doorbell camera system. In accordance with an exemplary embodiment of the present disclosure, the method for generating an event includes acquiring video of a visitor, outputting the acquired video of the visitor to a user, learning the user's feedback on the visitor, storing information of the visitor and a learning result of the user's feedback on the visitor, and generating an event based on the information of the visitor and the learning result of the user's feedback.

The method for generating an event and other embodiments may include the following features.

The learning of the user's feedback on the visitor may include acquiring the user's feedback on the video of the visitor, determining a reaction of the user to the visitor based on the acquired user's feedback, and learning the reaction of the user according to the determination result as the user's feedback on the visitor.

Furthermore, the user's feedback may include at least one of facial expression information, voice information, and behavior information of the user.

Furthermore, the storing of the information of the visitor and the learning result of the user's feedback on the visitor may include extracting the information of the visitor from the video of the visitor and storing the extracted information of the visitor and the learning result of the user's feedback.

Furthermore, the information of the visitor may include at least one of face information, body feature information, clothing information, and belongings information of the visitor.

Furthermore, the generating of the event based on the information of the visitor and the learning result of the user's feedback may include determining a reaction to be made to the visitor based on the information of the visitor and the learning result of the user's feedback, and generating the event based on the determination result.

The present disclosure also provides a doorbell camera system. In accordance with another exemplary embodiment of the present disclosure, the doorbell camera system includes a camera module configured to acquire video of a visitor, a user terminal configured to receive the acquired video of the visitor to output the received video, and learn a user's feedback on the visitor, and a control unit configured to extract information of the visitor from the video of the visitor and generate an event based on the information of the visitor and a learning result of the user's feedback.

The doorbell camera system and other embodiments may include the following features.

The user terminal may acquire the user's feedback on the video of the visitor, determine a reaction of the user to the visitor based on the acquired user's feedback, and learn the reaction of the user according to the determination result as the user's feedback on the visitor, and the user's feedback may include at least one of facial expression information, voice information, and behavior information of the user.

Furthermore, the control unit may determine a reaction to be made to the visitor based on the information of the visitor and the learning result of the user's feedback, and generate the event based on the determination result, and the information of the visitor may include at least one of face information, body feature information, clothing information, and belongings information of the visitor.

Furthermore, the doorbell camera system may further include a storage unit configured to store the information of the visitor and the learning result of the user's feedback on the visitor as a database, and the control unit may extract the information of the visitor from video of the visitor when the video of the visitor is acquired, compare the extracted information of the visitor with the database, and generate an event based on the user's feedback on the visitor matching the comparison result.

The present disclosure also provides a doorbell device. In accordance with yet another exemplary embodiment of the present disclosure, the doorbell device includes a camera configured to acquire video of a visitor, a feedback learning unit configured to learn a user's feedback on the visitor based on the acquired video of the visitor, and a control unit configured to extract information of the visitor from the video of the visitor, determine a response to be made to the visitor based on the information of the visitor and the learning result of the user's feedback, and generate the event based on the determination result.

The present disclosure also provides a method for generating an event, which is performed by the doorbell camera system. In accordance with yet another exemplary embodiment of the present disclosure, the method for generating an event includes acquiring video of a visitor, extracting information of the visitor from the video of the visitor, comparing the information of the visitor with a database, generating an event corresponding to the visitor when the visitor exists in the database and outputting the video of the visitor to the user to learn the user's feedback on the visitor, when the visitor does not exist in the database, and storing the information of the visitor that does not exist in the database and the learning result of the user's feedback on the visitor in a visitor database.

In accordance with yet another exemplary embodiment of the present disclosure, a doorbell device for generating an event for a visitor at a doorbell camera system includes: an input unit configured to receive first input data related to the visitor including at least one of video or audio of the visitor; a wireless communication unit configured to transmit the first input data to a user terminal and receive second input data related to a user's feedback on the first input data from the user terminal; an artificial intelligence (AI) module configured to learn the first input data based on at least one first learning algorithm to generate first output data related to the event, and learn the second input data based on at least one second learning algorithm to generate second output data related to the event; and a control unit configured to perform control to determine a danger level for the visitor based on at least one of the first output data or the second output data, and generate the event based on the danger level.

Furthermore, the first output data may include at least one of face information, body feature information, clothing information, and belongings information, of the visitor.

Furthermore, in the face information of the visitor, a face region of the visitor may be detected from the first input data based on a deep neural network (DNN) algorithm, and a face of the visitor may be recognized from the detected face region based on a Res Net algorithm.

Furthermore, the body feature information of the visitor may be learned based on at least one of a Mel frequency cepstral coefficient (MFCC) algorithm, a linear predictive coding (LPC) algorithm, or a long short-term memory (LSTM) algorithm.

Furthermore, the belongings information of the visitor may be learned based on a you-only-look-once (Yolo) algorithm.

Furthermore, the second output data may include facial expression information of the user.

Furthermore, the facial expression information of the user may be generated as JSON data obtained by data-converting a human facial expression into numbers and alphabets.

Furthermore, the danger level may be low, medium, or high.

Furthermore, the event may be doorbell ignore, door unlock, emergency call connection, or non-face-to-face payment module activation.

In accordance with yet another exemplary embodiment of the present disclosure, a doorbell device for generating an event for a visitor at a doorbell camera system includes: an input unit configured to receive first input data related to the visitor including at least one of video or audio of the visitor; an artificial intelligence (AI) module configured to learn the first input data based on at least one first learning algorithm to generate first output data related to the event, and learn second input data based on at least one second learning algorithm to generate second output data related to the event; a wireless communication unit configured to receive an uplink grant from a server, transmit the first input data to the user terminal based on the uplink grant, receive a downlink grant from the server, and receive the second input data related to the user's feedback on the first input data from the user terminal based on the downlink grant; and a control unit configured to perform control to generate the event based on the first output data or the second output data.

Furthermore, the second output data may include at least one of facial expression information, voice information, and behavior information of the user.

Furthermore, the control unit may be configured to perform an initial access procedure with the server for downlink synchronization and reception of system information, and perform a random access procedure with the server for uplink synchronization.

Furthermore, the initial access procedure may be performed by a synchronization signal block including a first synchronization signal, a second synchronization signal, and a broadcast channel, the synchronization signal block may include four consecutive OFDM symbols, the first synchronization signal, the broadcast channel, and the second synchronization signal may be transmitted for each OFDM symbol, each of the first synchronization signal and the second synchronization signal may include one OFDM symbol and 127 subcarriers, and the broadcast channel may include three OFDM symbols and 576 subcarriers.

Furthermore, the control unit may be configured to perform the random access procedure by transmitting a random access preamble sequence to the server and receiving a random access response message from the server.

Furthermore, the random access preamble sequence may include a long sequence and a short sequence having different lengths, and the length of the long sequence may be 839, and the length of the short sequence may be 139.

In accordance with yet another exemplary embodiment of the present disclosure, a doorbell device for generating an event for a visitor at a doorbell camera system includes: an input unit configured to receive first input data related to the visitor including at least one of video or audio of the visitor; an artificial intelligence (AI) module configured to learn the first input data based on at least one first learning algorithm to generate first output data related to the event, and learn second input data based on at least one second learning algorithm to generate second output data related to the event; a wireless communication unit configured to transmit the first input data to a user terminal, receive second input data related to a user's feedback on the first input data from the user terminal, receive an uplink grant and a downlink grant from the server, transmit the first output data and the second output data to the server based on the uplink grant, and receive danger level information indicating a danger level for the visitor from the server based on the downlink grant; and a control unit configured to perform control to generate the event based on the danger level.

BRIEF DESCRIPTION OF THE DRAWINGS

FIG. 16 illustrates an example of a JSON data format in which human facial expressions are expressed in numbers and alphabets through a facial action coding system.

FIG. 18 is a flowchart showing an example of a method for operating a doorbell device for generating an event depending on a visitor presented in the present disclosure.

FIG. 19 is a flowchart showing another example of a method for operating a doorbell device for generating an event depending on a visitor presented in the present disclosure.

FIG. 20 is a flowchart showing yet another example of a method for operating a doorbell device for generating an event depending on a visitor presented in the present disclosure.

DETAILED DESCRIPTION OF EMBODIMENTS

Figure 1:
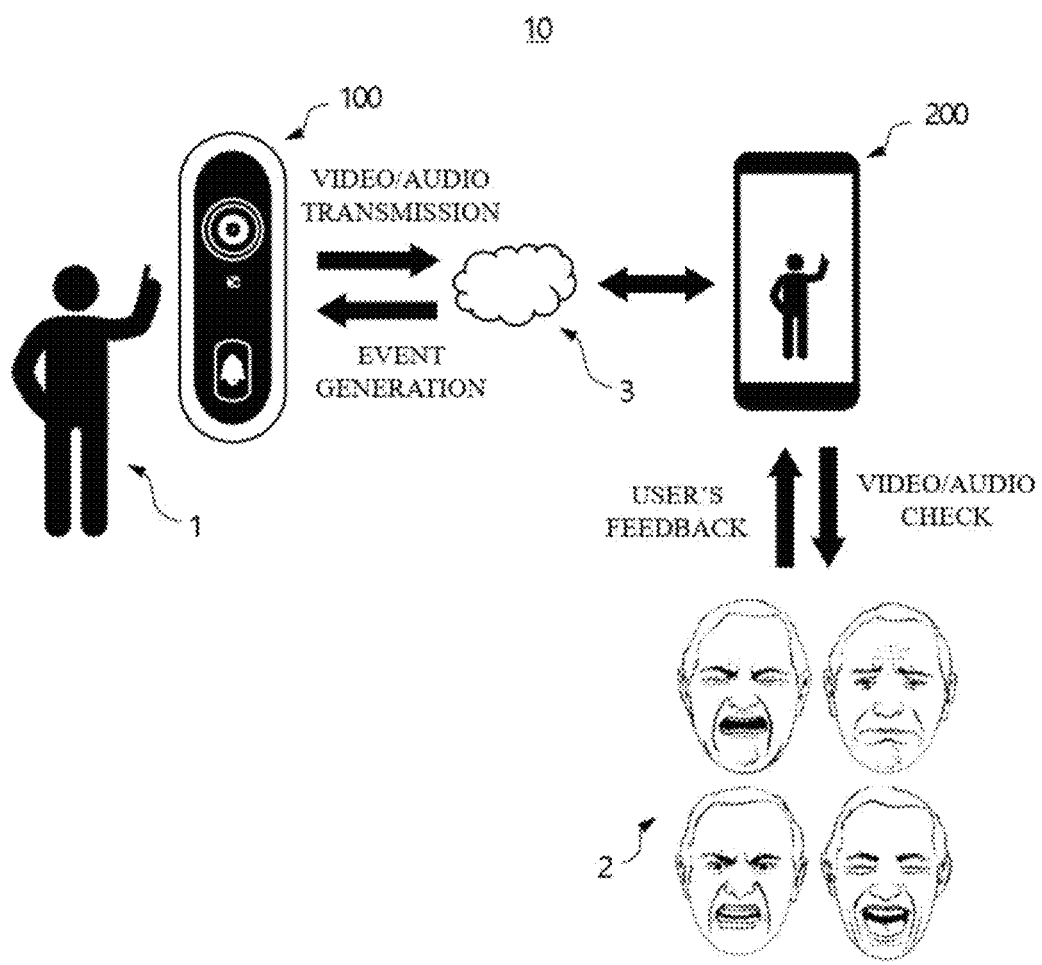
FIG. 1 illustrates the concept of a doorbell camera system and a method for generating an event in accordance with an exemplary embodiment of the present disclosure.

The technology disclosed herein may be applied to a doorbell camera device and system. However, the technology disclosed herein is not limited thereto, and may be applied to all devices and methods to which the technological spirit of the technology may be applied.

The terminology used herein is used only to describe a specific embodiment and is not intended to limit the spirit of the present disclosure. Further, the terminology used herein shall be construed as a meaning generally understood by those skilled in the art to which the present disclosure belongs unless specially defined otherwise, and shall not be construed in an excessively general meaning or in an excessively narrow meaning. Further, when the terminology used herein is an improper technical term, which fails to correctly express the spirit of the present disclosure, the terminology shall be substituted with the terminology, which those skilled in the art to which the present disclosure belongs may properly understand, to be understood. Further, a general term used herein shall be construed according to a meaning defined in a dictionary or the context of a related description, and shall not be construed to have an excessively narrow meaning.

Terms, such as "first" and "second", including an ordinal number used herein may be used for describing various elements, but the elements should not be limited by the terms. These terms are only used to distinguish one element from another element. For example, without departing from the scope of the present disclosure, a first element could be termed a second element, and similarly, a second element could be termed a first element.

Hereinafter, embodiments disclosed herein will be described in detail with reference to the accompanying drawings, but identical or similar components are denoted by the same reference numerals regardless of figure numbers, and redundant descriptions thereof will be omitted.

Furthermore, in the description of the technology disclosed herein, if it is determined that the detailed description of the known technology related to the present disclosure may unnecessarily obscure the subject matter of the technology disclosed herein, the detailed description thereof will be omitted. In addition, it should be noted that the accompanying drawings are for easy understanding of the spirit of the technology disclosed herein, and should not be construed as limiting the spirit of the technology by the accompanying drawings.

Hereinafter, with reference to the accompanying FIGS. 1 to 4, a configuration of a doorbell camera system in accordance with an exemplary embodiment of the present disclosure and a method for generating an event by the doorbell camera system in accordance with an exemplary embodiment of the present disclosure will be described.

FIG. 1 illustrates the concept of a doorbell camera system and a method for generating an event in accordance with an exemplary embodiment of the present disclosure.

Referring to FIG. 1, a doorbell camera system 10 disclosed in the present specification may include a doorbell device 100 that acquires video and audio of a visitor 1 when the visitor 1 presses the doorbell and transmits the acquired video and audio to a user device 200 through a network 3, and the user device 200 that outputs the video and audio of the visitor 1 received from the doorbell device 100, receives feedback from the user 2, and generates an event according to the feedback of the user 2.

The event may be an operation command for a specific function of the doorbell device 100 or an operation command for a specific function of the user device 200 according to responses to be made which are determined based on information of the visitor 1 and the feedback of the user 2, such as doorbell ignore, door unlock, emergency call connection, or non-face-to-face payment module activation.

In accordance with an exemplary embodiment, the user device 200 may be a personal portable device such as a smart phone or a smart pad, and may be a dedicated terminal device included in the doorbell camera system 10. In addition, the user device 200 may simply output the video and audio of the visitor 1 to the user 2, and may receive feedback from a user 2 through the provided camera, microphone, or sensors. In this case, the doorbell device 100 may analyze the feedback of the user 2 acquired at the user device 200, may generate an event according to the analyzed result, and may control the user device 200 through a separate control application program.

In accordance with an exemplary embodiment, the doorbell camera system 10 may be configured to further include a separate control server (not illustrated). When the control server is included in the doorbell camera system 10, the doorbell device 100 may simply perform functions of acquiring the video and audio of the visitor 1 and transmitting the acquired video and audio to the control server through the network 3, and the user device 200 may perform functions of outputting, to the user 2, the video and audio of the visitor 1 received from the control server and acquiring the feedback of the user 2 through the provided camera, microphone, or sensors. In this case, the control server may analyze the video and audio of the visitor 1 acquired at the doorbell device 100, may analyze the user 2's feedback on the visitor 1 acquired at the user device 200, and then may generate an event according to the analyzed result. In addition, the doorbell device 100 and the user device 200 may be controlled to perform the generated event.

Figure 2:
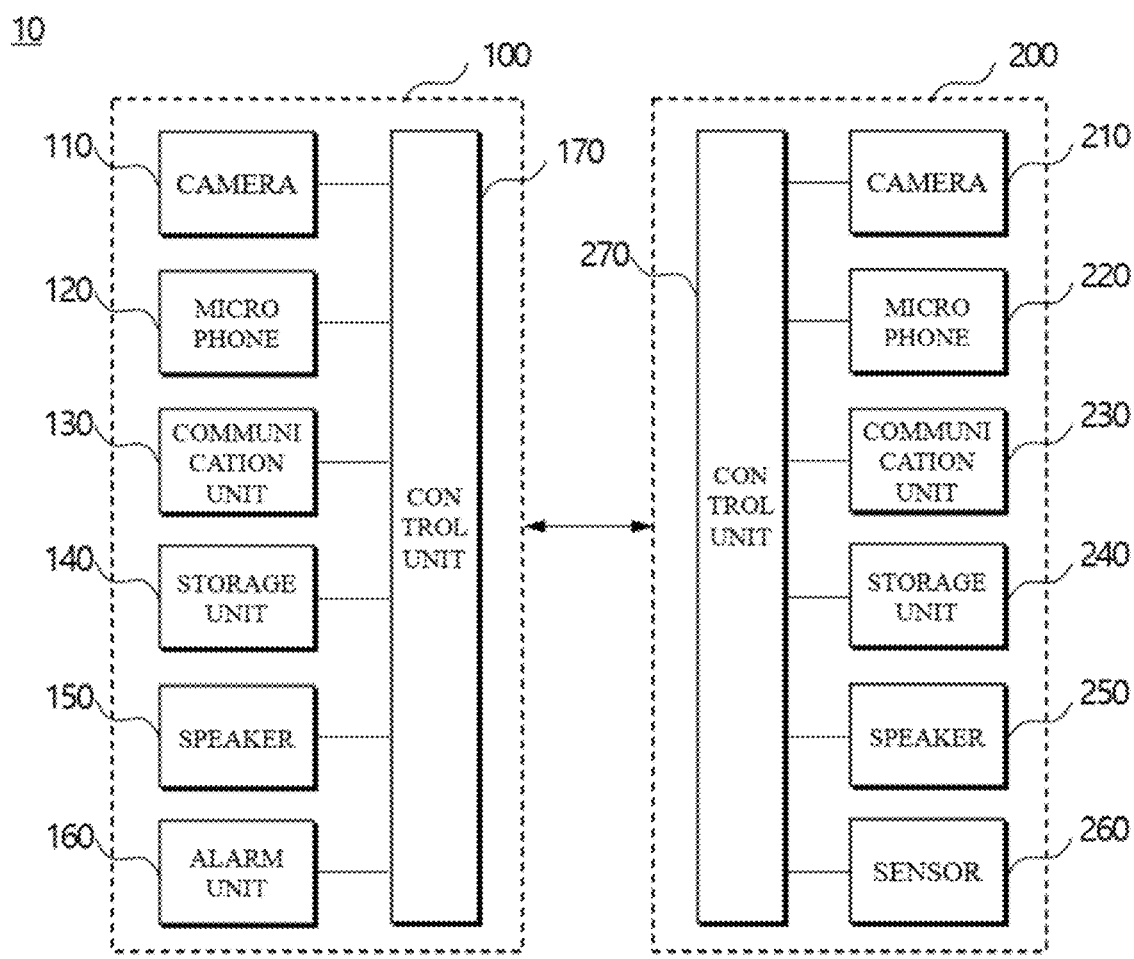
FIG. 2 is a block diagram illustrating in detail the components of a doorbell camera system in accordance with an exemplary embodiment of the present disclosure.

FIG. 2 is a block diagram illustrating in detail the components of a doorbell camera system in accordance with an exemplary embodiment of the present disclosure.

Referring to FIG. 2, the doorbell device 100 may include a camera 110, a microphone 120, a communication unit 130, a storage unit 140, a speaker 150, an alarm unit 160, and a control unit 170, and the user device 200 may include a camera 210, a microphone 220, a communication unit 230, a storage unit 240, a speaker 250, a sensor 260, and a control unit 270. The illustrated components are not essential, and thus the doorbell device 100 and the user device 200 may have more or fewer components than that.

Hereinafter, the components of the doorbell device 100 will be described in order.

The camera 110 may acquire video of the visitor 1 by capturing the visitor 1.

The microphone 120 may acquire audio of the visitor 1 by recording the voice of the visitor 1.

The communication unit 130 may transmit the video and audio of the visitor 1 acquired through the camera 110 and the microphone 120 to the user device 200 through the network 3.

The storage unit 140 may store data generated by the doorbell device 100, the acquired video and audio data, and data input from the outside.

The speaker 150 may output a standby sound when the doorbell is pressed, and may output the audio input by the user 2.

The alarm unit 160 may output an alarm message to be transmitted to the visitor 1 or to the outside, and may transmit alarm message indicating the visitor 1's visit to the user 2 who is located indoors.

The control unit 170 may control components of the doorbell device 100 to perform functions of each component. In accordance with an exemplary embodiment, the control unit 170 may learn the user's feedback on the visitor 1 based on the video and audio of the user 2, and the reaction of the user 2 measured from the sensor 260, which will be described later. In addition, the control unit 170 may extract the information of the visitor 1 from the acquired video of the visitor 1, and determine a response to be made for the visitor 1 based on the information of the visitor 1 and the learning result of user's feedback acquired from the user device 200, and generate an event based on the determination result.

Hereinafter, the components of the user device 200 will be described in order.

The camera 210 may acquire video of the user 2 by capturing the user 2. For example, the camera 210 may capture a facial expression or body movement of the user 2 who has checked the video of the visitor 1.

The microphone 220 may acquire audio of the user 2 by recording the voice of the user 2. For example, the microphone 220 may acquire audio of the user 2 who has checked the video of the visitor 1.

The communication unit 230 may receive the video and audio of the visitor 1 through the network 3 and transmit a control command for the generated event to the doorbell device 100. In accordance with an exemplary embodiment, the communication unit 230 may transmit the video and audio of the user 2 acquired through the camera 210 and the microphone 220 to the doorbell device 100 through the network 3, or may transmit them to the separate control server described above.

The storage unit 240 may store data generated by the user device 200, the acquired video and audio data, and data input from the outside. In addition, visitor information extracted from the video of the visitor 1 and the learning result of user 2's feedback may be stored as a database. In accordance with an exemplary embodiment, the visitor information and the learning result of the user 2's feedback may be transmitted to the control server and stored therein.

The speaker 250 may output the voice/sound transmitted from the doorbell device 100.

The sensor 260 may measure the reaction of the user 2 who has checked the video of the visitor 1. The reaction may be approaching and retreating operations of a user with respect to the user device 200, an operation of turning the user device 200 upside down and putting it face down on the floor, an operation of throwing the user device 200, sudden movement of the user device 200, and the like.

The control unit 270 may control components of the user device 200 to perform functions of each component.

In addition, the control unit 270 may learn a user's feedback on the visitor 1 based on the video of the user 2 acquired from the camera 210, the audio of the user 2 acquired from the microphone 220, and the reaction of the user 2 measured from the sensor 260.

In addition, the control unit 270 may extract the information of the visitor 1 from the video of the visitor 1, determine a response to be made for the visitor 1 based on the information of the visitor 1 and the learning result of the user 2's feedback, and generate an event based on the determination result.

The network 3 disclosed in the present specification may be, for example, a wireless network, a wired network, a public network such as the Internet, a private network, a global system for mobile communication network (GSM) network, a general packet radio network (GPRN), a local area network (LAN), a wide area network (WAN), a metropolitan area network (MAN), a cellular network, a public switched telephone network (PSTN), a personal area network, Bluetooth, Wi-Fi Direct, Near Field communication, Ultra-Wide band, a combination thereof, or any other network, but is not limited thereto.

The doorbell device 100 and the communication units 130 and 230 provided in the user device 200 may support the network 3, and data may be transmitted and received between the doorbell device 100 and the user device 200 through the communication units 130 and 230.

Hereinafter, a method for generating an event by a doorbell camera system in accordance with an exemplary embodiment of the present disclosure will be described in detail with reference to FIGS. 2 to 8.

Figure 3:
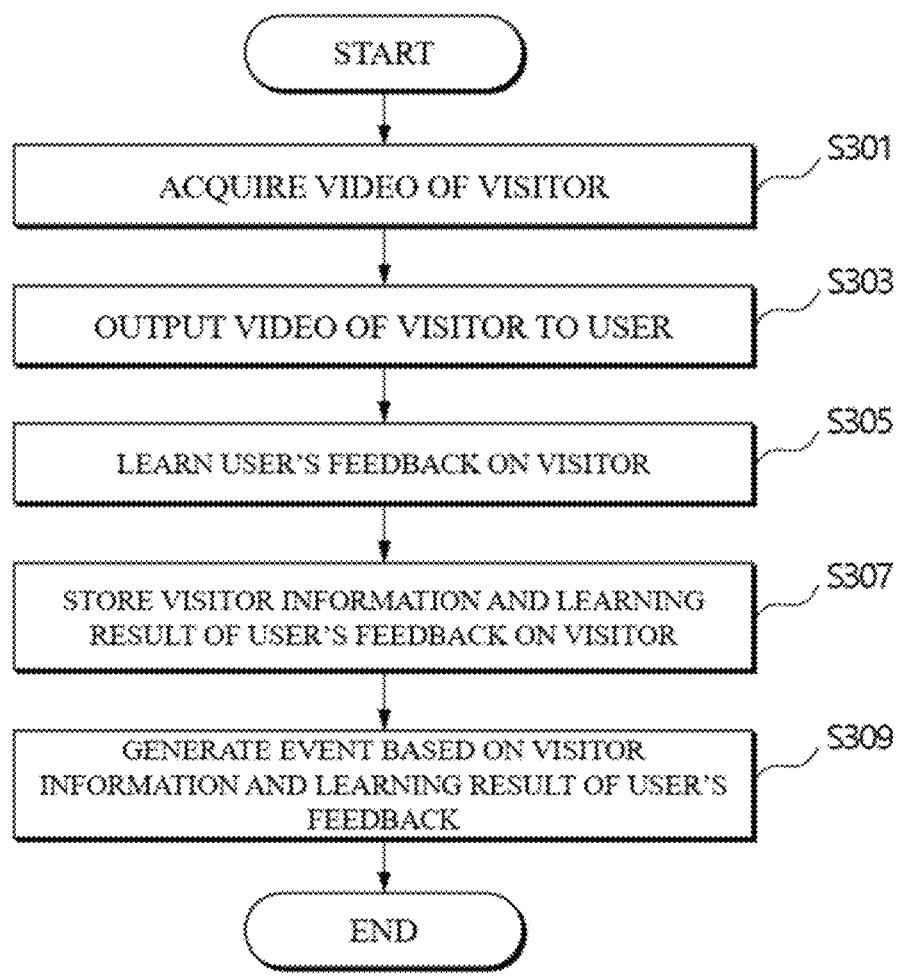
FIG. 3 is a flowchart illustrating a method for generating an event in accordance with an exemplary embodiment of the present disclosure in a doorbell camera system in accordance with an exemplary embodiment of the present disclosure.

FIG. 3 is a flowchart illustrating a method for generating an event in accordance with an exemplary embodiment of the present disclosure in a doorbell camera system in accordance with an exemplary embodiment of the present disclosure.

First, the doorbell camera system 10 acquires video of a visitor (S301). Next, the doorbell camera system 10 outputs the acquired video of the visitor to a user (S303). Next, the doorbell camera system 10 learns the user's feedback on the visitor (S305). Next, the doorbell camera system 10 stores visitor information and the learning result of the user's feedback on the visitor (S307). Next, the doorbell camera system 10 generates an event based on the visitor information and the learning result of the user's feedback (S309).

Figure 4:
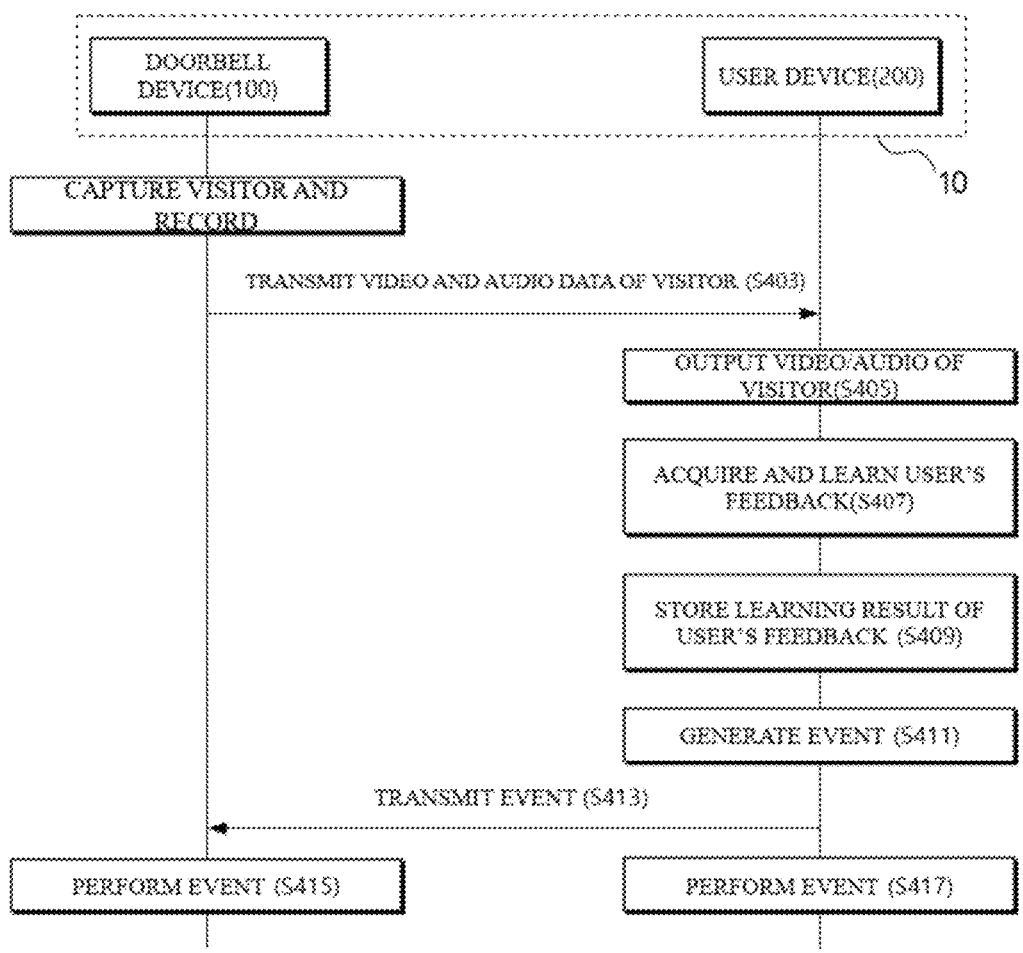
FIG. 4 is a flowchart illustrating a method for generating an event in accordance with an exemplary embodiment of the present disclosure in a doorbell camera system in accordance with an exemplary embodiment of the present disclosure which includes a doorbell device and a user device.

FIG. 4 is a flowchart illustrating a method for generating an event in accordance with an exemplary embodiment of the present disclosure in a doorbell camera system in accordance with an exemplary embodiment of the present disclosure which includes the doorbell device 100 and the user device 200. The method for generating an event in accordance with an exemplary embodiment of the present disclosure will be described in detail with reference to the drawings.

The following description will be described as being performed by the doorbell device 100 and the user device 200 together; however, in accordance with an exemplary embodiment, the user device 200 may perform alone by using the information acquired at the doorbell device 100, or the doorbell device 100 may perform alone by using the information acquired at the user device 200. In accordance with an exemplary embodiment, a separate external control server alone may perform operations of visitor analysis, user feedback analysis and learning, and event generation by using the information acquired at the doorbell device 100 and the user device 200.

First, when the visitor presses the doorbell, the doorbell device 100 captures the visitor, acquires video of the visitor, and acquires audio of the visitor (S401).

Subsequently, the doorbell device 100 transmits the acquired video and audio data of the visitor to the user device 200 through the network (S403).

Next, the user device 200 outputs the video and audio of the visitor received from the doorbell device 100 to the user (S405). In this case, the user checks the video and audio of the visitor output from the user device 200 and then expresses a feedback on the visitor. The user's feedback may be surprise, sadness, irritability, absence of expression, fear, horror, anxiety, joy, gladness, hesitation, and the like, and such feedback may be determined by the user device 200 by analyzing the user's facial expression, voice expression (tone, intonation, swear words, or the like), behavior pattern (pretending to be absent, blocking the ears, turning the user device upside down, raising the user's head, dropping the user device, or the like), or the like.

Next, the user device 200 acquires user's feedback on the above-described visitor and learns it (S407). The acquiring of the user's feedback may be performed through capturing the user's facial expression or body movement by the camera 210, recording the user's voice by the microphone 220, detecting, by the sensor 260, the operation of the user approaching and retreating from the user device 200, the operation of turning the user device 200 upside down and putting it face down on the floor, and the operation of throwing the user device 200, detecting sudden movement of the user device 200, detecting biometric information of the user, or the like. The user device 200 may determine whether a specific visitor is a safe person or a dangerous person by learning repeated feedback, that is, a reaction of the user to the visitor. In accordance with an exemplary embodiment, the doorbell device 100 may learn user's feedback by receiving user feedback information.

Next, the user device 200 extracts visitor information from the video of the visitor, and stores the visitor information and the learning result of the user's feedback (S409). The visitor information may be a visitor's face information, body feature information (height, body shape, voice, or the like), clothing feature information (clothes logo, the type of clothes, the characters on the clothes, the colors of the clothes, or the like), belongings information (weapon, delivery box, or the like), or the like, and the user device 200 may analyze the above-mentioned information to determine whether the visitor is a safe person. In accordance with an exemplary embodiment, the extracting and analyzing of the visitor information may be directly performed by the doorbell device 100.

Next, the user device 200 generates an event based on the visitor information and the learning result of the user's feedback (S411). The user device 200 determines a response to be made based on the visitor information and the learning result of the user's feedback, and then generates an appropriate event according to the determined response to be made. For example, when the response to be made, which is determined for the visitor, is to block the visitor, an event such as stopping the operation of the doorbell or connecting an emergency call may be generated, when the response is to bring the visitor into the house, an event for unlocking the door may be generated, and when the visitor is an employee of a delivery company, an event for paying for a corresponding product by activating the non-face-to-face payment module may be generated.

Next, if the generated event is to be performed by the doorbell device 100, the user device 200 transmits the generated event to the doorbell device 100 (S413).

Finally, the doorbell device 100 executes a command according to the received event (S415), and if the event is an event to be performed by the user device 200, the user device 200 performs the event (S417). The event may be an operation command for a specific function of the doorbell device 100 or may be an operation command for a specific function of the user device 200 according to responses to be made which are determined based on visitor information and the feedback of the user, such as doorbell ignore, door unlock, emergency call connection, non-face-to-face payment module activation, or output of the alarm message to the user.

FIGS. 5 to 8 are diagrams illustrating various exemplary embodiments of a method for generating an event by a doorbell camera system in accordance with an exemplary embodiment of the present disclosure.

Figure 5:
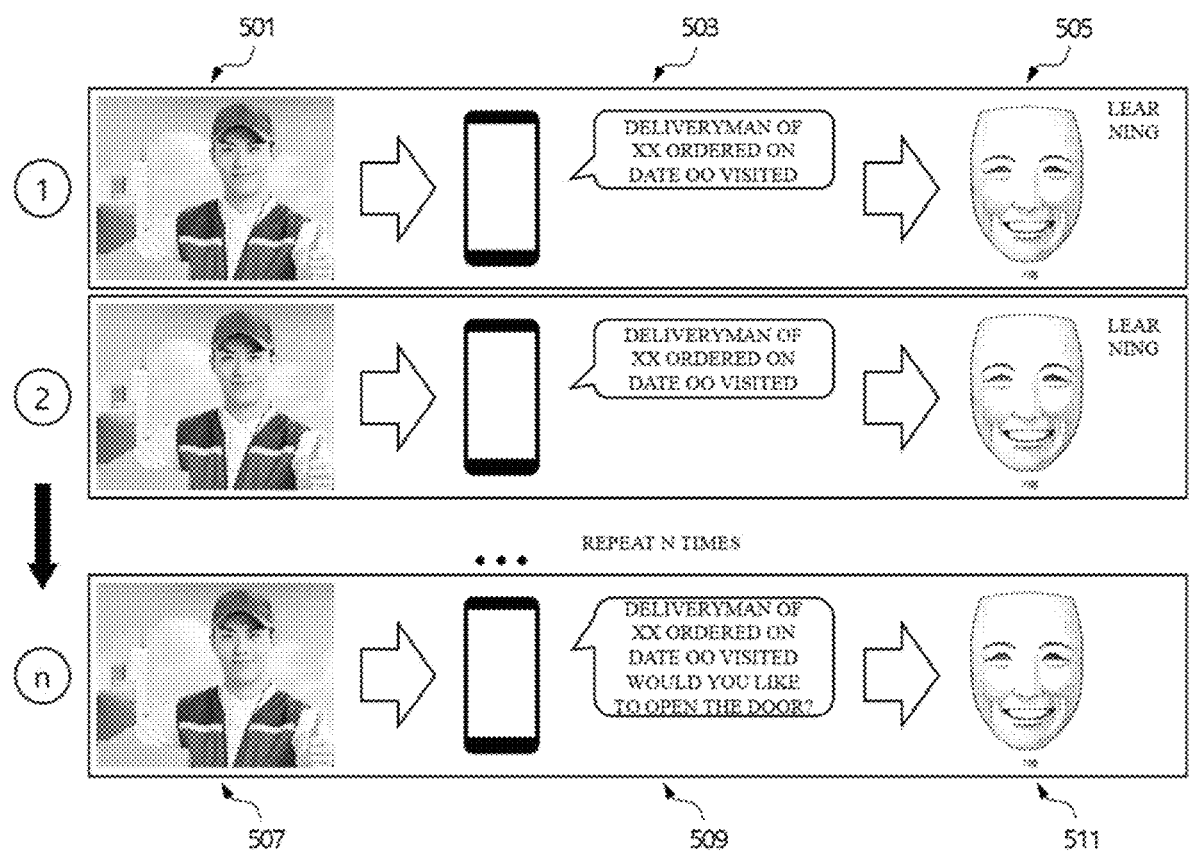
FIGS. 5 to 8 are diagrams illustrating various exemplary embodiments of a method for generating an event by a doorbell camera system in accordance with an exemplary embodiment of the present disclosure.

FIG. 5 describes a delivery service among various exemplary embodiments of the method for generating an event by the doorbell camera system 10 in accordance with an exemplary embodiment of the present disclosure. Referring to the drawing, when a deliveryman, a visitor, presses the doorbell (501), a camera provided in the doorbell camera system 10 captures the visitor and outputs it to the user (503). In this case, when the user has previously registered information related to the visitor to the doorbell camera system 10, the doorbell camera system 10 extracts visitor information from the video of the visitor, and then compares the visitor information with the previously registered information to output related messages to the user. In the exemplary embodiment, when the user registers the delivery service information in the doorbell camera system 10 in advance, the video of the visitor is output to the user along with the message "Deliveryman of XX ordered on date OO visited." When the user checks the output message and the video of the visitor and then expresses the feedback, the doorbell camera system 10 acquires the user's feedback and then learns it (505). In an exemplary embodiment, when the user gives, as a feedback, facial expressions related to emotions such as welcome, enjoyment, and joy for the delivery service ordered by the user, the doorbell camera system 10 stores the learning result for the delivery service ordered by the user as the user's safe state. The doorbell camera system 10 learns the user's feedback a predetermined number of times or until the learning result is higher than a certain quality, and then, when the deliveryman visits again (1107), reflects the learning result of the user's feedback and outputs a message, "Deliveryman of XX ordered on date OO visited. Would you like to open the door?". Subsequently, when the user reacts with positive feedback such as a previously learned facial expression, the doorbell camera system 10 generates an event for unlocking the door and automatically opens the door to the visitor (511).

Figure 6:
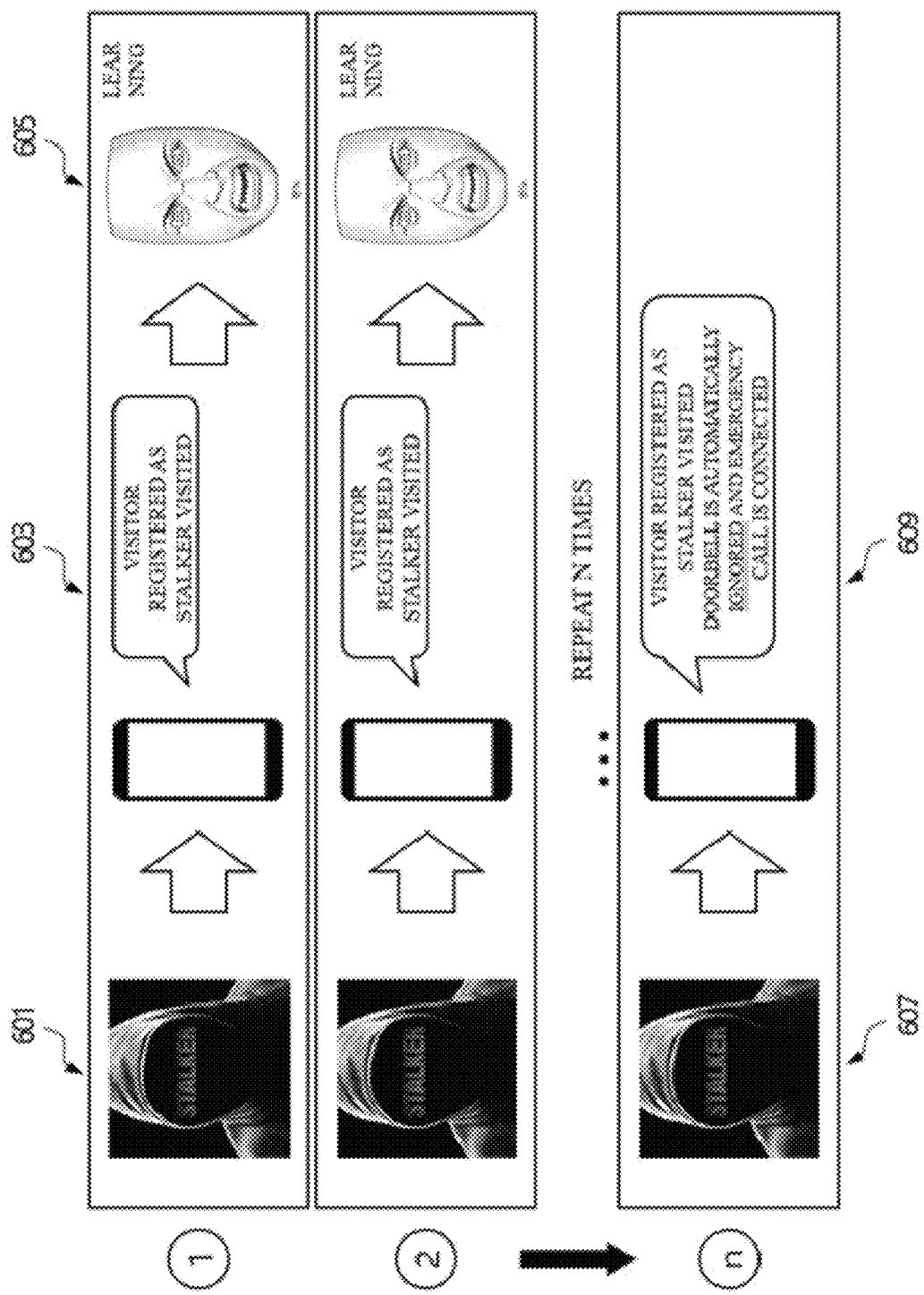

FIG. 6 describes a dangerous person response service among various exemplary embodiments of the method for generating an event by the doorbell camera system 10 in accordance with an exemplary embodiment of the present disclosure. Referring to the drawing, when a dangerous person (stalker), a visitor, presses the doorbell (601), a camera provided in the doorbell camera system 10 captures the visitor and outputs it to the user (603). In this case, when the user has previously registered information related to the visitor to the doorbell camera system 10, the doorbell camera system 10 extracts visitor information from the video of the visitor, and then compares the visitor information with the previously registered information to output related messages to the user. In the exemplary embodiment, when the user registers dangerous person information in the doorbell camera system 10 in advance, the video of the visitor is output to the user along with the message "a visitor registered as a stalker visited." When the user checks the output message and the video of the visitor and then expresses the feedback, the doorbell camera system 10 acquires the user's feedback and then learns it (605). In an exemplary embodiment, when the user gives, as a feedback, facial expressions related to emotions such as anger, fear, and horror for the dangerous person, the doorbell camera system 10 stores the learning result for the person such as a stalker as a person dangerous to the user. The doorbell camera system 10 learns the user's feedback a predetermined number of times or until the learning result is higher than a certain quality, and then, when the dangerous person visits again (607), reflects the learning result of the user's feedback and outputs a message, "A visitor registered as a stalker visited. The doorbell is automatically ignored and an emergency call is connected". Subsequently, the doorbell camera system 10 automatically ignores the doorbell regardless of the user's feedback and generates an event for making a connection to a previously registered emergency call (609).

Figure 7:
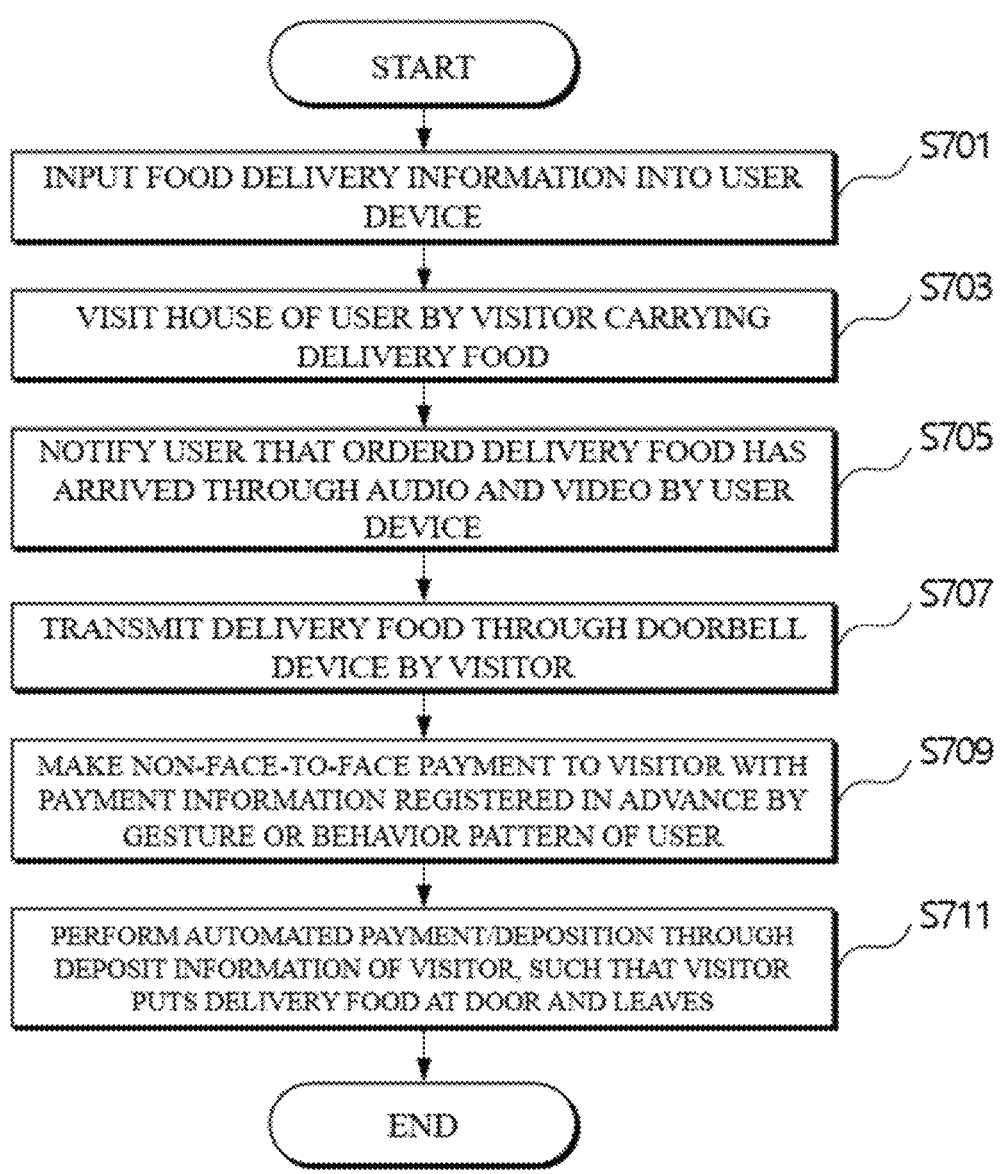

FIG. 7 describes a method for generating an event in a food delivery situation as an exemplary embodiment of a method for generating an event by the doorbell camera system 10 in accordance with an exemplary embodiment of the present disclosure. Referring to the drawing, first, a user registers food delivery information in the doorbell camera system 10 (S701), and then a visitor carrying a delivery food visits the house of the user and presses the doorbell (S703). Subsequently, the user device 200 captures the visitor, extracts the visitor information from the video of the visitor, and then notifies the user that the ordered delivery food has arrived through video and audio (S705). Next, the visitor delivers the delivery food to the user through the doorbell device 100 (S707). Next, when the user expresses a specific gesture, behavior pattern, facial expression, or the like, the user device 200 activates the payment module, and makes payment to the visitor in a non-face-to-face state with previously registered payment information (S709). When payment is confirmed, the visitor puts the delivery food at the door and leaves (S711).

Figure 8:
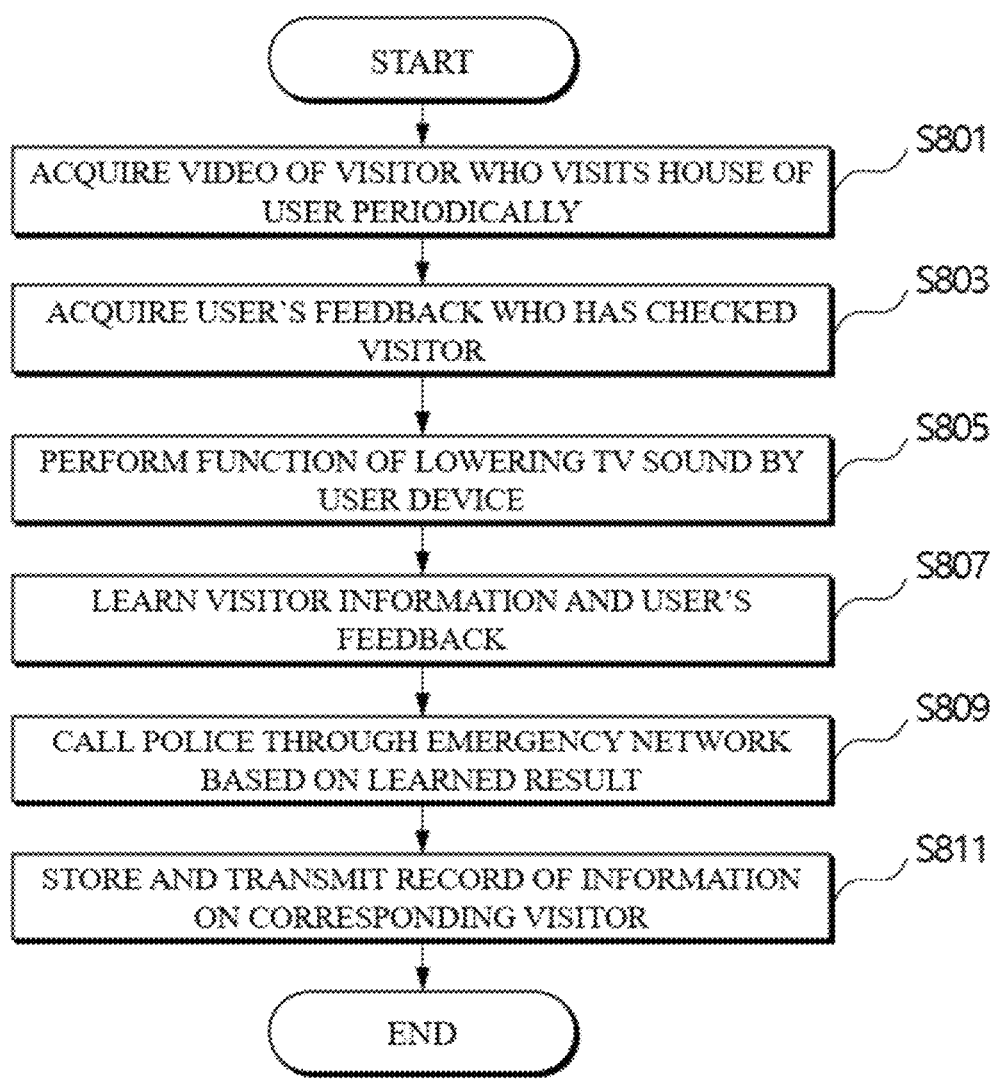

FIG. 8 describes in detail a method for generating an event for responding to the dangerous person of FIG. 6. Referring to the drawing, when the dangerous person (stalker), the visitor, visits the house of the user periodically and presses the doorbell (S801), the user checks the video of the visitor through the doorbell device 100, and then makes a fearful face, puts the user device 200 face down and pretends not to be at home. The user device 200 acquires user's feedback expressed by the user's facial expressions and actions (S803). The user device 200 generates an event to perform a function of lowering the TV sound according to the user's feedback (S805). In addition, the user device 200 extracts and learns visitor information from the video of the visitor, and learns the acquired user's feedback (S807). Next, the user device 200 calls the police through the emergency network based on the learned result (S809). Next, the user device 200 stores information on the corresponding visitor and generates an event to be transmitted to the user device and the emergency call destination (S811).

Figure 9:
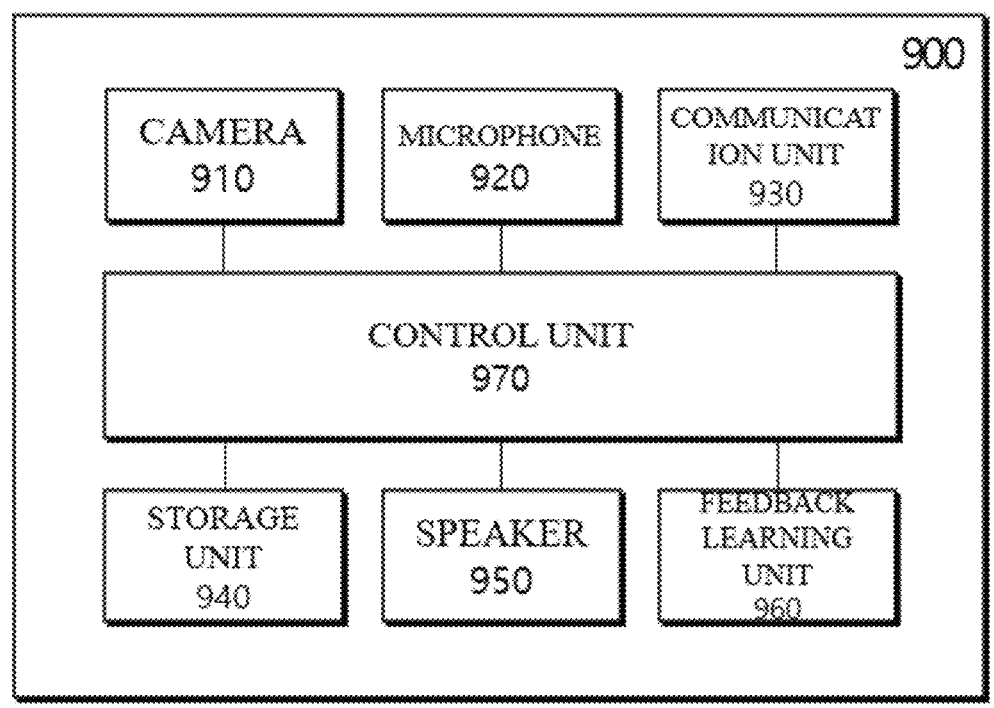
FIG. 9 is a block diagram illustrating components of a doorbell device in accordance with an exemplary embodiment of the present disclosure.

FIG. 9 is a block diagram illustrating components of a doorbell device in accordance with an exemplary embodiment of the present disclosure.

Referring to FIG. 9, a doorbell device 900 may include a camera module 910, a microphone 920, a communication unit 930, a storage unit 940, a speaker 950, a feedback learning unit 960, and a control unit 970. The illustrated components are not essential, and thus the doorbell device 900 may have more or fewer components than that. The doorbell device 900 alone may perform the function of the doorbell camera system in accordance with the exemplary embodiment of the present disclosure illustrated in FIG. 2.

Hereinafter, the components of the doorbell device 900 will be described in order.

The camera 910 may acquire video of a visitor by capturing the visitor.

The microphone 920 may acquire audio of the visitor by recording the voice of the visitor.

The communication unit 930 may transmit the video and audio of the visitor acquired through the camera 910 and the microphone 920 to an external user device (not illustrated) through a network, and may receive the feedback of the user who has checked the video of the visitor.

The storage unit 940 may store data generated at the doorbell device 900, the acquired video/audio data, data input from the outside, data received from a user device, and a user's feedback on the visitor.

The speaker 950 may output a standby sound when the doorbell is pressed, and may output the audio input by the user.

The feedback learning unit 960 may learn the user's feedback on the visitor received through the communication unit 930.

The control unit 970 may extract visitor information from the video of the visitor, may determine a response to be made for the visitor based on the visitor information and the learning result of the user's feedback, and may generate an event based on the determination result.

Figure 10:
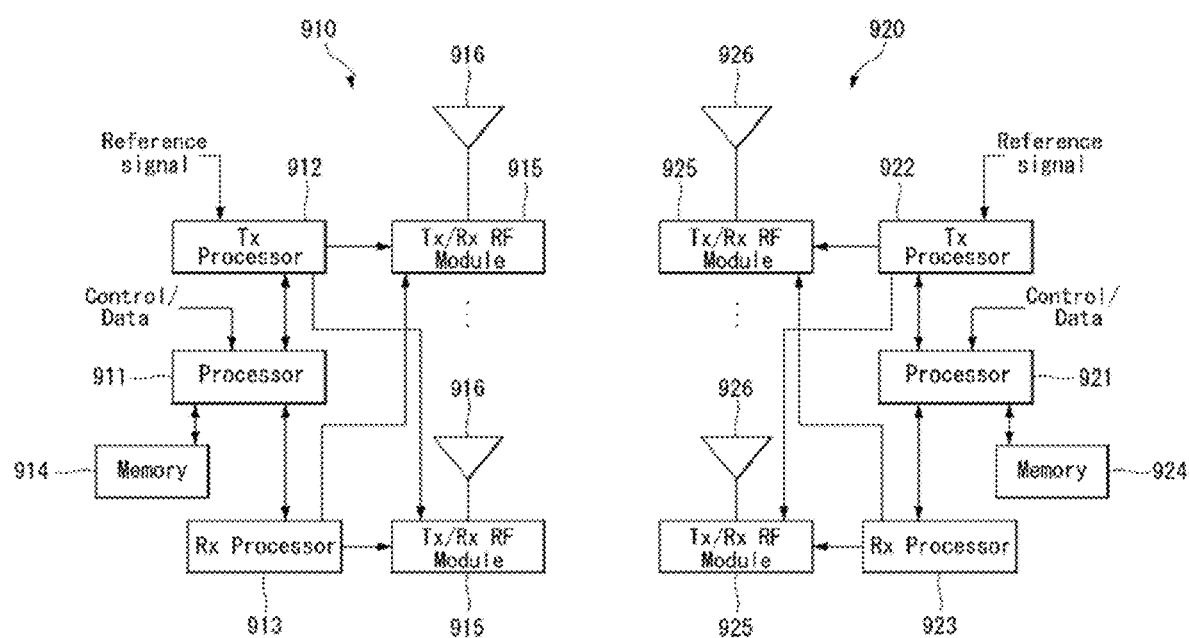
FIG. 10 illustrates a block diagram of a wireless communication system to which methods in accordance with the present disclosure may be applied.

FIG. 10 illustrates a block diagram of a wireless communication system to which methods in accordance with the present disclosure may be applied.

Referring to FIG. 10, a device (AI device) including an AI module is defined as a first communication device (910 in FIG. 10), and the processor 911 may perform detailed AI operations.

A 5G network including another device communicating with the AI device is a second communication device (920 in FIG. 10), and the processor 921 may perform detailed AI operations.

The 5G network may be referred to as the first communication device and the AI device may be referred to as the second communication device.

For example, the first communication device or the second communication device may be a doorbell device, a user terminal, a base station, a network node, a transmission terminal, a receiving terminal, a wireless device, a wireless communication device, a vehicle, a vehicle having an autonomous traveling function, a connected car, a drone (unmanned aerial vehicle; UAV), an artificial intelligence (AI) module, a robot, an augmented reality (AR) device, a virtual reality (VR) device, a mixed reality (MR) device, a CCTV, a holographic device, a public safety device, an MTC device, an IoT device, a medical device, a fintech device (or financial device), a security device, a climate/environment device, a device related to 5G services, or a device related to other related fields of the 4th industrial revolution.

For example, a user terminal is a mobile phone, a smartphone, a laptop computer, a digital broadcasting terminal, a personal digital assistant (PDA), a portable multimedia player (PMP), a navigation system, and a slate PC, a tablet PC, an ultrabook, a wearable device (e.g., smartwatch, smart glass, head mounted display (HMD)), or the like.

Referring to FIG. 10, the first communication device 910 and the second communication device 920 include processors 911 and 921, memories 914 and 924, one or more Tx/Rx RF modules (radio frequency module) 915 and 925, Tx processors 912 and 922, Rx processors 913 and 923, and antennas 916 and 926, respectively. The Tx/Rx module is also called a transceiver. Each Tx/Rx module 915 transmits a signal through each antenna 926. The processor implements the functions, processes, and/or methods described above. The processor 921 may be associated with the memory 924 for storing program code and data. The memory may be referred to as a computer-readable medium. More specifically, in a downlink (DL) (communication from the first communication device to the second communication device), the transmit (TX) processor 912 implements various signal processing functions for an L1 layer (that is, the physical layer). The receiving (RX) processor implements various signal processing functions of the L1 layer (that is, physical layer).

Uplink (UL) (communication from the second communication device to the first communication device) is handled at the first communication device 910 in a manner similar to that described in connection with the receiver function at the second communication device 920. Each Tx/Rx module 925 receives a signal through each antenna 926. Each Tx/Rx module provides an RF carrier and information to the RX processor 923. The processor 921 may be associated with the memory 924 for storing program code and data. The memory may be referred to as a computer-readable medium.

In accordance with an exemplary embodiment of the present disclosure, the first communication device may be a doorbell device, and the second communication device may be a server or a 5G network.

The initial access (IA) procedure in the 5G communication will be additionally described.

The communication device may perform cell search, system information acquisition, beam alignment for initial access, and DL measurement based on a synchronization signal block (SSB). SSB is used interchangeably with a synchronization signal/physical broadcast channel (SS/PBCH) block.

The SSB includes primary and secondary synchronization signals (PSS and SSS) and PBCH. The SSB includes four consecutive OFDM symbols, and PSS, PBCH, SSS/PBCH or PBCH are transmitted for each OFDM symbol. Each of the PSS and SSS includes one OFDM symbol and 127 subcarriers, and the PBCH includes three OFDM symbols and 576 subcarriers.

Cell search refers to a process in which the UE acquires time/frequency synchronization of a cell and detects a cell identifier (ID) (e.g., physical layer Cell ID and PCI) of the cell. The PSS is used to detect a cell ID within a cell ID group, and the SSS is used to detect a cell ID group. PBCH is used for SSB (time) index detection and half-frame detection.

There are 336 cell ID groups, and there are three cell IDs for each cell ID group. There are a total of 1008 cell IDs. Information on a cell ID group to which a cell ID of a cell belongs is provided/acquired through the SSS of the cell, and information on the cell ID among 336 cells in the cell ID is provided/acquired through the PSS.

The SSB is transmitted periodically with the SSB periodicity. The SSB basic periodicity assumed by the UE during initial cell search is defined as 20 ms. After the cell access, the SSB periodicity may be set to one of 5 ms, 10 ms, 20 ms, 40 ms, 80 ms, 160 ms by the network (e.g., BS).

Next, system information (SI) acquisition will be described.

The SI is divided into a master information block (MIB) and a plurality of system information blocks (SIB). The SI other than the MIB may be referred to as remaining minimum system information (RMSI). The MIB includes information/parameter for monitoring the PDCCH that schedules the PDSCH carrying the system information block1 (SIB1), and is transmitted by the BS through the PBCH of the SSB. The SIB1 includes information about the availability and the scheduling (e.g., transmission periodicity, SI-window size) of the remaining SIBs (hereinafter SIBx, where x is an integer of 2 or more). The SIBx is included in the SI message and is transmitted through the PDSCH. Each SI message is transmitted within a time window (that is, SI-window) that periodically occurs.

A random access (RA) procedure in the 5G communication system will be additionally described.

The random access procedure is used for various purposes. For example, the random access procedure may be used for initial network access, handover, UE-triggered UL data transmission, and the like. The communication device may acquire UL synchronization and UL transmission resources through the random access procedure. The random access procedure is classified into a contention-based random access procedure and a contention-free random access procedure. A detailed procedure of the contention-based random access procedure is as follows.

The communication device may transmit a random access preamble as Msg1 of the random access procedure in the UL through the PRACH. Random access preamble sequences having two different lengths are supported. The long sequence length 839 is applied to a subcarrier spacing of 1.25 and 5 kHz, whereas the short sequence length 139 is applied to a subcarrier spacing of 15, 30, 60, and 120 kHz.

If the server receives the random access preamble from the communication device, the server transmits the random access response (RAR) message (Msg2) to the communication device. The PDCCH for scheduling the PDSCH carrying the RAR is CRC-masked with a random access (RA) radio network temporary identifier (RNTI) (RA-RNTI) and then transmitted. The communication device detecting the PDCCH masked with the RA-RNTI may receive the RAR from the PDSCH scheduled by the DCI carried by the PDCCH. The communication device checks whether the random access response information about the preamble transmitted by the communication device, that is, the Msg1 is in the RAR or not. The presence or absence of the random access information about the Msg1 transmitted by the communication device may be determined by the presence or absence of the random access preamble ID about the preamble transmitted by the communication device. If there is no response to the Msg1, the communication device may re-transmit the RACH preamble within a predetermined number of times while performing power ramping. The communication device calculates the PRACH transmission power for the re-transmission of the preamble based on the most recent path loss and power ramping counter.

The communication device may perform the UL transmission on the uplink shared channel as the Msg3 of the random access procedure based on the random access response information. The Msg3 may include an RRC connection request and a communication device identifier. As the response to the Msg3, the network may transmit the Msg4, which may be handled as a contention resolution message on the DL. By receiving the Msg4, the communication device may enter an RRC connected status.

A BM procedure may be divided into (1) a DL BM procedure using an SSB or a CSI-RS and (2) a UL BM procedure using a sounding reference signal (SRS). In addition, each BM procedure may include Tx beam swiping for determining a Tx beam and Rx beam swiping for determining an Rx beam.

Hereinafter, the DL BM procedure using an SSB will be described.

Configuration of a beam report using the SSB is performed when channel state information (CSI)/beam is configured in RRC CONNECTED.

- The communication device (e.g., UE) receives a CSI-ResourceConfig IE including CSI-SSB-Resource-SetList for SSB resources used for BM from a server (e.g., BS). The RRC parameter csi-SSB-Resource-SetList represents a list of SSB resources used for beam management and report in one resource set. Here, an SSB resource set may be set as {SSBx1, SSBx2, SSBx3, SSBx4, . . . }. An SSB index may be defined in the range of 0 to 63.
- The UE receives the signals on SSB resources from the BS based on the CSI-SSB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE may assume that the CSI-RS and the SSB are quasi co-located (QCL) from the viewpoint of 'QCL-TypeD'.

Here, QCL-TypeD may mean that antenna ports are quasi co-located (QCL) from the viewpoint of a spatial Rx parameter. When the UE receives signals of a plurality of DL antenna ports in a QCL-TypeD relationship, the same Rx beam may be applied.

Massive machine type communication (mMTC) is one of 5G scenarios for supporting a hyper-connection service providing simultaneous communication with a large number of UEs. In this environment, a UE intermittently performs communication with a very low speed and mobility. Accordingly, a main goal of mMTC is to operate a UE for a long time at a low cost. With respect to mMTC, 3GPP deals with MTC and narrow band (NB)-IoT.

mMTC has features such as the repetitive transmission of a PDCCH, a PUCCH, a physical downlink shared channel (PDSCH), a PUSCH, and the like, frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission may be performed through frequency hopping, and for repetitive transmission, (RF) retuning from a first frequency resource to a second frequency resource may be performed in a guard period, and the specific information and the response to the specific information may be transmitted/received through a narrowband (e.g., 6 resource blocks (RBs) or 1 RB).

Figure 11:
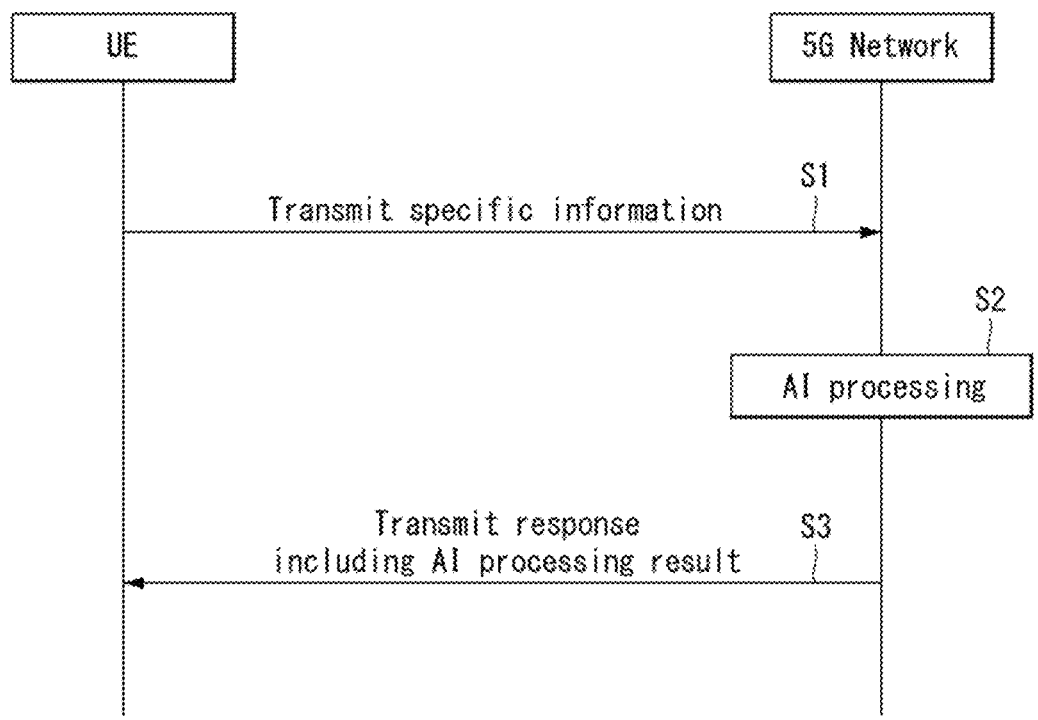
FIG. 11 illustrates an example of basic operations of a user terminal and a 5G network in a 5G communication system.

FIG. 11 illustrates an example of basic operations of a communication device and a 5G network (or server) in a 5G communication system.

The communication device (e.g., UE) transmits specific information to the 5G network (S1). In addition, the 5G network performs 5G processing on the specific information (S2). Here, the 5G processing may include AI processing. In addition, the 5G network transmits a response including the AI processing result to the UE (S3).

Hereinafter, the operation of an AI using 5G communication will be described in more detail with reference to the wireless communication technology described above.

First, a basic procedure of an applied operation to which a method presented in the present disclosure which will be described later and the eMBB technology of 5G communication are applied will be described.

As in steps S1 and S3 of FIG. 11, the UE performs an initial access procedure and a random access procedure with the 5G network prior to step S1 of FIG. 11 in order to transmit/receive signals, information and the like to/from the 5G network.

More specifically, the UE performs an initial access procedure with the 5G network based on an SSB in order to acquire DL synchronization and system information. A beam management (BM) procedure and a beam failure recovery procedure may be added in the initial access procedure, and quasi-co-location (QCL) relation may be added in a process in which the UE receives a signal from the 5G network.

In addition, the UE performs a random access procedure with the 5G network for UL synchronization acquisition and/or UL transmission. The 5G network may transmit, to the UE, a UL grant for scheduling transmission of specific information. Accordingly, the UE transmits the specific information to the 5G network based on the UL grant. In addition, the 5G network transmits, to the UE, a DL grant for scheduling transmission of 5G processing results with respect to the specific information. Therefore, the 5G network may transmit a response including the AI processing result to the UE based on the DL grant.

Next, a basic procedure of an applied operation to which a method presented in the present disclosure which will be described later and the URLLC technology of 5G communication are applied will be described.

As described above, a UE may receive DownlinkPreemption IE from the 5G network after the UE performs an initial access procedure and/or a random access procedure with the 5G network. Then, the UE receives DCI format 2_1 including a preemption indication from the 5G network based on DownlinkPreemption IE. The UE does not perform (or expect or assume) reception of eMBB data in resources (PRBs and/or OFDM symbols) indicated by the preemption indication. Subsequently, when the UE needs to transmit specific information, the UE may receive a UL grant from the 5G network.

Next, a basic procedure of an applied operation to which a method presented in the present disclosure which will be described later and the mMTC technology of 5G communication are applied will be described.

Description will focus on parts in the steps of FIG. 11 which are changed from the application of mMTC.

In step S1 of FIG. 11, the UE receives a UL grant from the 5G network in order to transmit specific information to the 5G network. Here, the UL grant may include information on the number of repetitions of transmission of the specific information and the specific information may be repeatedly transmitted based on the information on the number of repetitions. That is, the UE transmits the specific information to the 5G network based on the UL grant. Then, the repetitive transmission of the specific information may be performed through frequency hopping, the first transmission of the specific information may be performed in a first frequency resource, and the second transmission of the specific information may be performed in a second frequency resource. The specific information may be transmitted through a narrowband of 6 resource blocks (RBs) or 1 RB.

The above-described 5G communication technology may be combined with methods presented in the present disclosure which will be described later and applied or may complement the methods presented in the present disclosure to make technical features of the methods concrete and clear.

Figure 12:
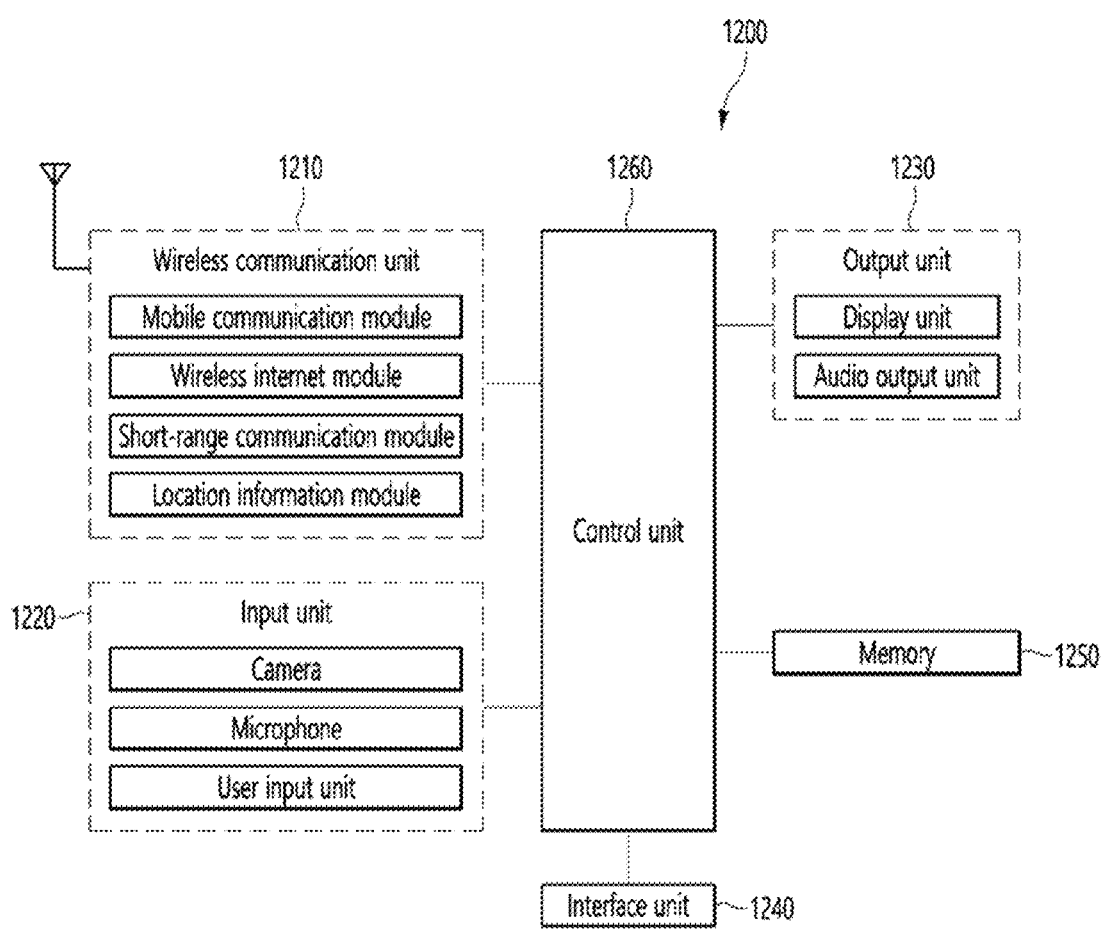
FIG. 12 is a block diagram illustrating a communication device in accordance with the present disclosure.

FIG. 12 is a block diagram illustrating a communication device in accordance with the present disclosure.

A communication device 1200 may include a wireless communication unit 1210, an input unit 1220, an output unit 1230, an interface unit 1240, a memory 1250, a control unit 1260, or the like. The components illustrated in FIG. 12 are not essential for implementing the communication device, and thus, the communication device described in the present disclosure may have more or fewer components than the components listed above.

More specifically, among the components described above, the wireless communication unit 1210 may include one or more modules that enables wireless communication between the communication device and the wireless communication system, or between the communication device and other wireless communication devices, or between the communication device and an external server. In addition, the wireless communication unit may include one or more modules for connecting the communication device to one or more networks.

The wireless communication unit 1210 may include at least one of a broadcast reception module, a mobile communication module, a wireless Internet module, a short-range communication module, and a location information module.

The input unit 1220 includes a camera or video input unit for inputting a video signal, a microphone or an audio input unit for inputting an audio signal, and a user input unit for receiving information from a user (for example, a touch key, and push key (mechanical key)). Voice data or image data collected by the input unit 1220 may be analyzed and processed as a control command of the user.

The output unit 1230 is a unit for generating output related to visual, auditory, tactile, and the like, and may include at least one of a display unit and an audio output unit. The display unit forms a mutual layer structure with the touch sensor or is integrally formed therewith to implement a touch screen. The touch screen may function as a user input unit for providing an input interface between the communication device and the user, and at the same time, may provide an output interface between the communication device and the user.

The interface unit 1240 functions as a passageway with various types of external devices connected to the communication device. The interface unit 1240 may include at least one of a wired/wireless headset port, an external charger port, a wired/wireless data port, a memory card port, and a port for connecting a device equipped with an identification module, an audio input/output (I/O) port, a video input/output (I/O) port, or an earphone port. In response to the connection of the external device to the interface unit, in the communication device, appropriate control related to the connected external device may be performed.

In addition, the memory 1250 stores data for supporting various functions of the communication device. The memory may store a plurality of application programs (application programs or applications) running on the communication device, data for operation of the communication device, and instructions. At least some of the application programs may be downloaded from an external server through wireless communication. In addition, at least some of the application programs may be present on the communication device from the time of shipment for basic functions of the communication device (e.g., call incoming and outgoing functions, message receiving and sending functions). Meanwhile, the application program may be stored in the memory, installed on the communication device, and executed by a control unit to perform an operation (or function) of the communication device.

In addition to the operation related to the application program, the control unit 1260 generally controls the overall operation of the communication device. The control unit may provide or process appropriate information or functions to the user by processing signals, data, information, and the like input or output through the above-described components or by executing the application program stored in the memory.

In addition, in order to execute the application program stored in the memory, the control unit may control at least some of the components elements described with reference to FIG. 12. Furthermore, the control unit may operate at least two or more of the components included in the communication device in combination with each other in order to execute the application program.

At least some of the above components may operate in cooperation with each other to implement an operation, control, or control method of the communication device according to various exemplary embodiments described below. In addition, the operation, control, or control method of the communication device may be implemented on the communication device by executing at least one application program stored in the memory.

Figure 13:
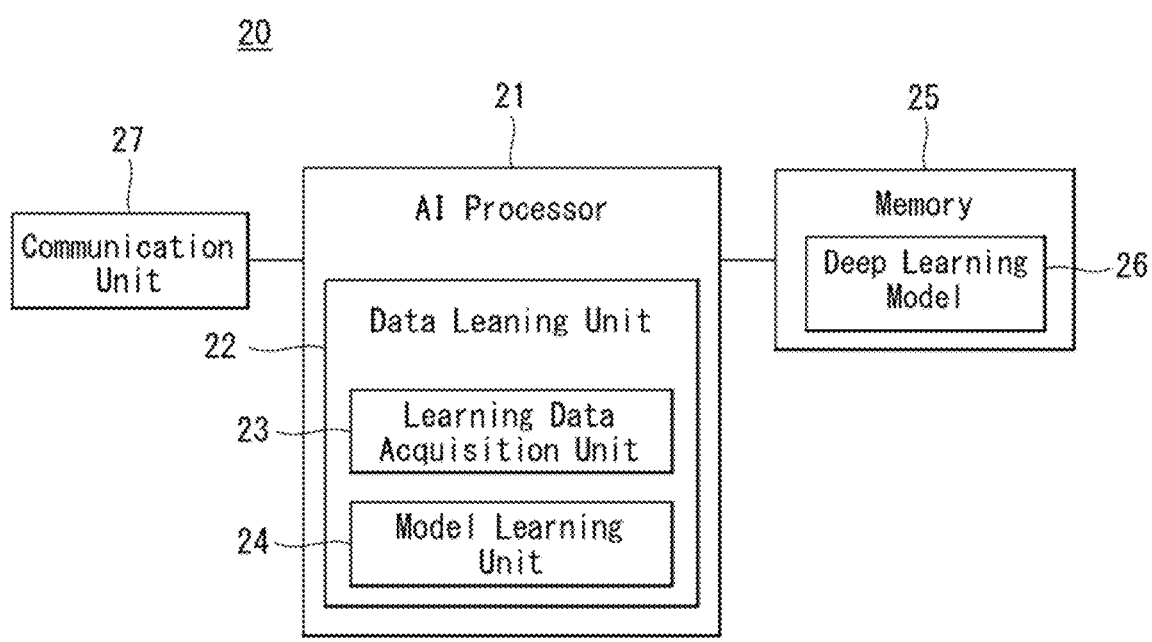
FIG. 13 is a block diagram of an artificial intelligence (AI) device in accordance with an exemplary embodiment of the present disclosure.

FIG. 13 is a block diagram of an artificial intelligence (AI) device in accordance with an exemplary embodiment of the present disclosure.

An AI device 50 may include a communication device including an AI module capable of performing AI processing, a server including the AI module, or the like. In addition, the AI device 50 may be included as at least a part in the communication device illustrated in FIG. 12 and may be provided to perform at least some of AI processing together.

The AI device 50 may include an AI processor 51, a memory 55 and/or a communication unit 57.

The AI device 50 is a computing device capable of learning a neural network, and may be implemented as various electronic devices such as a server, a desktop PC, a notebook PC, and a tablet PC.

The AI processor 51 may learn a neural network by using a program stored in the memory 55. In particular, the AI processor 51 may learn a neural network for recognizing vehicle-related data. Here, the neural network for recognizing vehicle-related data may be designed to simulate a human brain structure on a computer, and may include a plurality of network nodes with weights that simulate neurons of the human neural network. The plurality of network modes may exchange data according to their respective connection relationships such that neurons may simulate the synaptic activity of neurons for sending and receiving signals through synapses. Here, the neural network may include a deep learning model developed from a neural network model. In the deep learning model, a plurality of network nodes may be located in different layers and exchange data according to a convolutional connection relationship. Examples of neural network models include various deep learning techniques, such as deep neural networks (DNN), convolutional deep neural networks (CNN), recurrent neural networks (RNN), restricted Boltzmann machine (RBM), deep belief networks (DBN), or Deep Q-Networks, and may be applied to fields such as computer vision, speech recognition, natural language processing, and speech/signal processing.

Meanwhile, the processor that performs the functions as described above may be a general-purpose processor (e.g., CPU), but may be an AI dedicated processor (e.g., GPU) for artificial intelligence learning.

The memory 55 may store various programs and data required for the operation of the AI device 50. The memory 55 may be implemented by a non-volatile memory, a volatile memory, a flash memory, a hard disk drive (HDD), a solid state drive (SDD), or the like. The memory 55 is accessed by the AI processor 51, and data read/write/edit/delete/update by the AI processor 51 may be performed. In addition, the memory 55 may store a neural network model (e.g., a deep learning model 56) generated through a learning algorithm for data classification/recognition in accordance with an exemplary embodiment of the present disclosure.

Meanwhile, the AI processor 51 may include a data learning unit 52 for learning a neural network for data classification/recognition. The data learning unit 52 may learn a criterion on which training data to use and how to classify and recognize data using the training data in order to determine data classification/recognition. The data learning unit 52 may learn the deep learning model by acquiring training data to be used for learning and applying the acquired training data to the deep learning model.

The data learning unit 52 may be manufactured in the form of at least one hardware chip and mounted on the AI device 50. For example, the data learning unit 52 may be manufactured in the form of a dedicated hardware chip for artificial intelligence (AI), or may be manufactured as a part of a general-purpose processor (CPU) or a dedicated graphics processor (GPU) and mounted on the AI device 50. In addition, the data learning unit 52 may be implemented as a software module. When implemented as a software module (or a program module including an instruction), the software module may be stored in a non-transitory computer-readable medium. In this case, at least one software module may be provided by an operating system (OS) or an application.

The data learning unit 52 may include a training data acquisition unit 53 and a model learning unit 54.

The training data acquisition unit 53 may acquire training data requested for the neural network model for classifying and recognizing data. For example, the training data acquisition unit 53 may acquire vehicle data and/or sample data for input into the neural network model as training data.

The model learning unit 54 may learn to have a criterion for determining how the neural network model classifies predetermined data by using the acquired training data. In this case, the model learning unit 54 may train the neural network model through supervised learning using at least a portion of the training data as a criterion for determination. Alternatively, the model learning unit 54 may train the neural network model through unsupervised learning to discover a criterion by self-learning using the training data without being supervised. In addition, the model learning unit 54 may train the neural network model through reinforcement learning by using feedback on whether the result of situation determination based on the learning is correct. In addition, the model learning unit 54 may train the neural network model by using a learning algorithm including an error back-propagation method or a gradient decent method.

When the neural network model is trained, the model learning unit 54 may store the learned neural network model in the memory. The model learning unit 54 may store the learned neural network model in a memory of a server connected to the AI device 50 via a wired or wireless network.

The data learning unit 52 may further include a training data preprocessor (not illustrated) and a training data selection unit (not illustrated) in order to improve the analysis result of the recognition model or to save resources or time required for generating the recognition model.

The training data preprocessor may preprocess the acquired data such that the acquired data may be used for learning to determine the situation. For example, the training data preprocessor may process the acquired data into a preset format such that the model learning unit 54 may use the training data acquired for learning for image recognition.

In addition, the training data selection unit may select data required for training from the training data acquired by the training data acquisition unit 53 or the training data preprocessed by the preprocessor. The selected training data may be provided to the model learning unit 54. For example, the training data selection unit may select only data on an object included in a specific region as the training data by detecting the specific region among images acquired through a vehicle camera.

In addition, the data learning unit 52 may further include a model evaluation unit (not illustrated) to improve the analysis result of the neural network model.

The model evaluation unit may input evaluation data to the neural network model, and may cause the model learning unit 54 to retrain the neural network model when an analysis result output from the evaluation data does not satisfy a predetermined criterion. In this case, the evaluation data may be predefined data for evaluating the recognition model. For example, the model evaluation unit may evaluate the model as not satisfying a predetermined criterion when, among the analysis results of the trained recognition model for the evaluation data, the number or ratio of evaluation data for which the analysis result is inaccurate exceeds a preset threshold.

The communication unit 57 may transmit the AI processing result by the AI processor 51 to an external communication device.

Here, the external communication device may be defined as an autonomous vehicle. In addition, the AI device 50 may be defined as another vehicle or 5G network that communicates with the autonomous traveling module vehicle. Meanwhile, the AI device 50 may be implemented by being functionally embedded in an autonomous traveling module provided in a vehicle. In addition, the 5G network may include a server or module that performs autonomous traveling-related control. In addition, the AI device 50 may be implemented through a home server.

Meanwhile, the AI device 50 illustrated in FIG. 13 has been functionally divided into the AI processor 51, the memory 55, and the communication unit 57; however, it is noted that the above-mentioned components are integrated into one module and referred to as an AI module.

Figure 14:
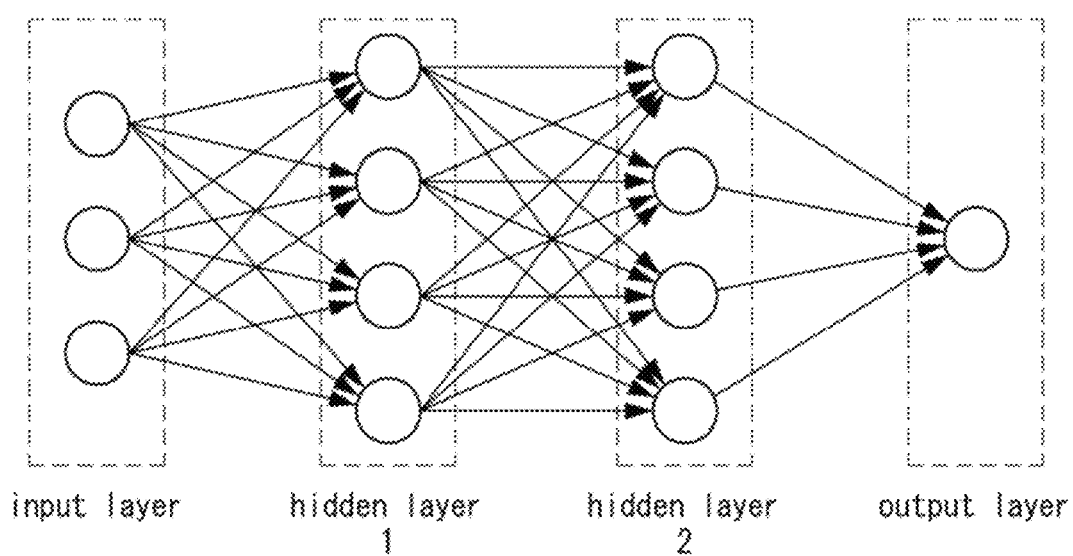
FIG. 14 is an example of a deep neural network (DNN) model to which the present disclosure may be applied.

FIG. 14 is an example of a deep neural network (DNN) model to which the present disclosure may be applied.

The deep neural network (DNN) is an artificial neural network (ANN) including several hidden layers between an input layer and an output layer. The deep neural network may model complex non-linear relationships, as in typical artificial neural networks.

For example, in a deep neural network structure for an object identification model, each object may be represented as a hierarchical configuration of basic image elements. In this case, the additional layers may aggregate the characteristics of the gradually gathered lower layers. This feature of deep neural networks allows more complex data to be modeled with fewer units (nodes) than similarly performed artificial neural networks.

As the number of hidden layers increases, the artificial neural network is called 'deep', and machine learning paradigm that uses such a sufficiently deepened artificial neural network as a learning model is called deep learning. Furthermore, the sufficiently deep artificial neural network used for the deep learning is commonly referred to as the deep neural network (DNN).

In the present disclosure, data required to train a POI data generation model may be input to the input layer of the DNN, and meaningful data that may be used by a user may be generated through the output layer while the data pass through the hidden layers.

FIGS. 10 to 14 described above may be applied in combination with methods presented in the present disclosure, which have been described above and will be described below, or may be supplemented to specify or clarify the technical features of the methods presented in the present disclosure.

Hereinafter, the process of learning information about the visitor (video and/or audio of the visitor) and user's feedback (or user's reaction) through an AI device (or AI module) and generating an event for the visitor through the learned result will be described in more detail.

As illustrated in FIG. 13, the AI device may include a communication unit, an AI processor, and a memory, may be included in at least one of a doorbell device, a user device, or a control server, or may be implemented as a separate device.

When the AI device is implemented as a separate device, the AI device may transmit and receive signals to and from the doorbell device, user device, and/or control server via wired/wireless communication.

For convenience of description, information about the visitor acquired by the doorbell device, that is, the video and/or voice of the visitor, will be expressed as 'input data 1', the user's feedback acquired by the user device will be expressed as 'input data 2', and data from the input data 1 and the input data 2 through the AI device will be expressed as 'output data 1' and 'output data 2', respectively.

That is, the AI device may output the output data 1 and the output data 2 respectively by using various algorithms for the input data 1 and the input data 2, and may generate a result of the user's feedback, that is, an event based on the output data 1 and the output data 2.

In addition, 'A and/or B' used in the present disclosure may be interpreted as having the same meaning as 'including at least one of A or B'.

First, a process of learning the input data 1 by the AI device to output the output data 1 will be described.

The AI device detects a face region of the visitor from input data 1 based on the DNN algorithm. For a more detailed description of the DNN algorithm, refer to the aforementioned DNN model.

Then, the AI device recognizes the face of the visitor in the detected face region based on deep residual learning for Image Recognition (Res Net) algorithm.

The Res Net algorithm is an algorithm that complements the previous face recognition algorithm, and refers to an algorithm that compensates for learning errors that occur due to more differentiation as the layer deepens.

In addition, the AI device extracts physical characteristics such as the voice of the visitor from the input data 1 based on the Mel-frequency cepstrum (MFCC)/Linear Predictive Coding (LPC) algorithm, and learns the extracted value based on the long short-term memory (LSTM) algorithm.

The MFCC algorithm is an algorithm for extracting human features by analyzing the spectrum of sound, the LPC algorithm is an algorithm for extracting a speech feature by modeling a vocal tract, and LSTM algorithm is a learning algorithm that has been complemented to avoid the problem of dependence period of the recurrent neural network (RNN).

In addition, the AI device may learn whether the visitor has an item from input data 1 based on a Yolo algorithm.

The Yolo (you-only-look-once) algorithm is an algorithm for a learning method that is 6 times faster than the faster region-convolutional neural network (R-CNN).

That is, the AI device may generate output data 1 by analyzing information on input data 1 through the above learning procedure.

For example, the AI device may analyze video and/or audio of the visitor to generate the output data 1 on whether the visitor is a criminal based on at least one of (1) whether the visitor is wearing dangerous equipment, (2) the duration of the visitor at a specific location, or (3) appearance frequency of the visitor. The dangerous equipment may be a hat, mask, bat, iron pipe, or the like.

Next, a process of learning input data 2 and outputting output data 2 by the AI device will be described.

First, the AI device detects a face region of the user from input data 2 based on the DNN algorithm.

Then, the AI device recognizes a face of the user in the detected face region based on the Res Net algorithm.

Then, the AI device analyzes an emotion of the user through the recognized the face of the user based on Paul Ekman's facial expression analysis and/or facial action coding system (FACS), and generates emotion analysis data. Here, the emotion analysis data may be included in the output data 2.

Hereinafter, the Paul Ekman's facial expression analysis and facial action coding system will be briefly described.

Paul Ekman's facial expression analysis is an analysis method for correlating seven common emotions (disgust, contempt, sadness, horror, anger, surprise, and joy) with human facial expressions.

The human facial expressions may be classified into macro-expression and micro-expression by time difference. The macro-expression refers to a change in a person's usual facial expression which appears over 0.5 to 4 seconds, and the micro-expression refers to an expression which appears instantaneously in a very short time of 0.2 to 0.3 seconds.

Figure 15:
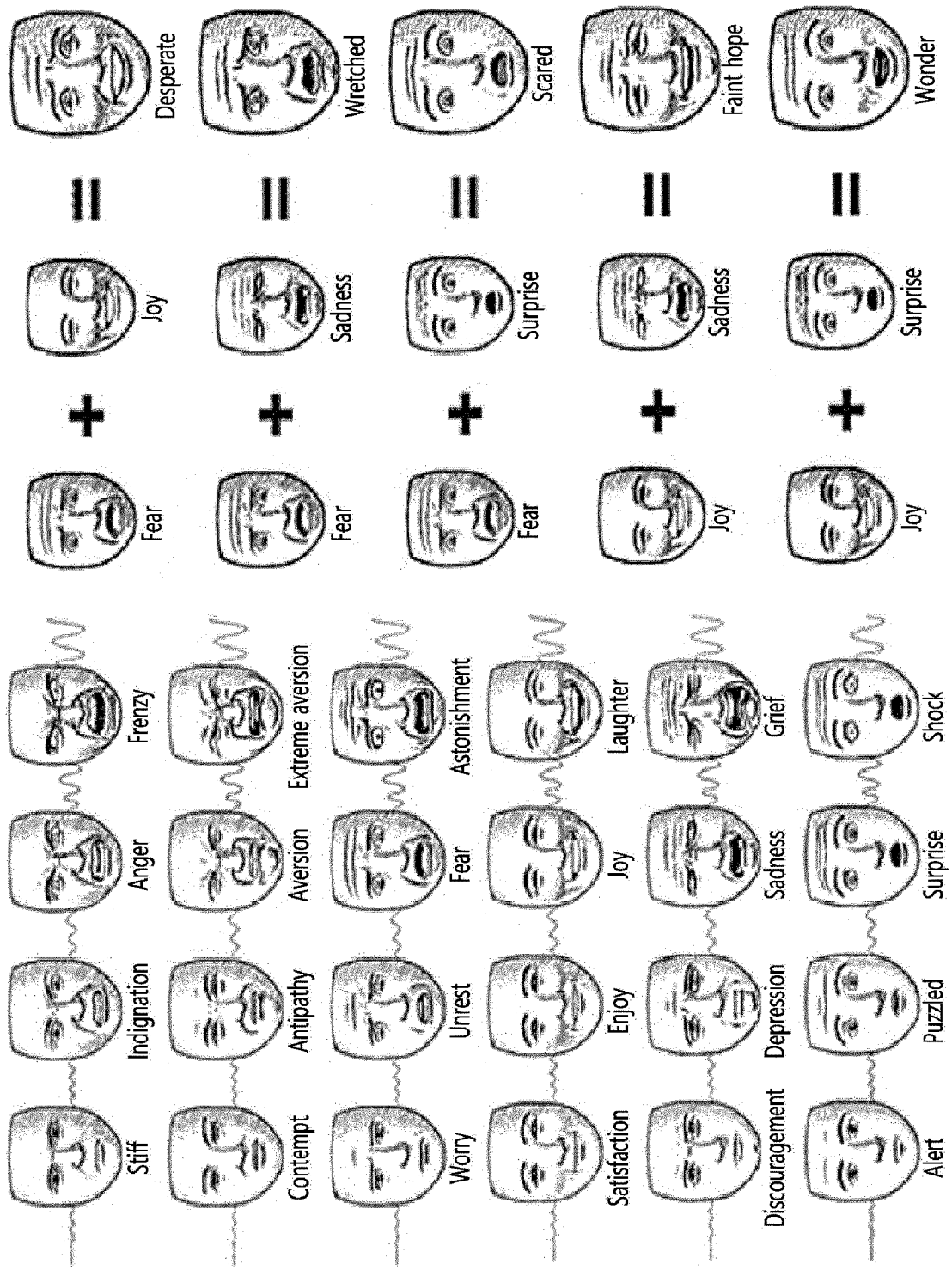
FIG. 15 is a diagram illustrating an example of Scott McCloud's making comics.

FIG. 15 is a diagram illustrating an example of Scott McCloud's making comics.

Table 1 shows an example of a danger level calculation table showing a danger level with changes in human facial expressions in order to perform the method presented in the present disclosure.

TABLE 1

| Expression | Type | Danger level | Remark |
|---|---|---|---|
| Frenzy | 1 | High | — |
| Aversion | 2 | High | — |
| Astonishment | 3 | Low | — |
| Laughter | 4 | Medium | — |
| Grief | 5 | Medium | — |
| Shock | 6 | Medium | — |

In addition, human facial expressions may be quantified or encoded through a Facial Action Coding System (FACS). In this case, there is an advantage that human facial expressions may be managed by DB.

The facial action coding system (FACS) refers to a process of data-converting human facial expressions into numbers and alphabets.

Here, the alphabet grade may be classified into A to E, which refer to a fine expression (trace) which is a starting expression, a slight expression (slight), a distinct expression (marked), a clear expression (pronounced), a serious expression (severe), and an extreme expression (extreme) and a best expression (maximum). That is, in the facial action coding, an alphabet is assigned to each facial expression step such that the facial expressions are graded with signs.

FIG. 16 illustrates an example of a JSON data format in which human facial expressions are expressed in numbers and alphabets through a facial action coding system.

In the JavaScript Object Notation (JSON) data of FIG. 16, the faceType field may be analysis reference data in changes in facial expression, and Table 1 may be referred to. Referring to Table 1 when the faceType field value of FIG. 16 is '01', the type value is '1', which indicates that the facial expression value is 'frenzy' and the danger level is 'High'.

The faceId field represents the unique ID of the subject of the expression, the faceRectagle field represents the coordinates of the face, and the faceRetainCount field represents the frequency of the subject staying in the video data.

Figure 17:
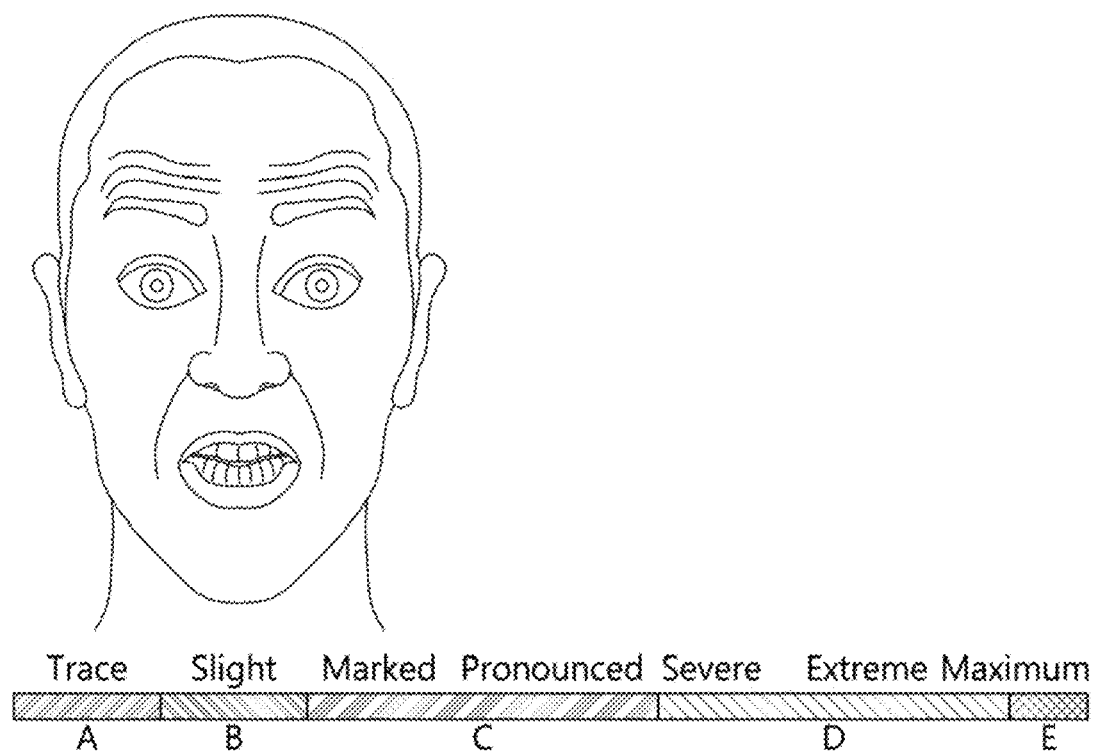
FIG. 17 shows an example of an expression code calculation table.

Furthermore, the faceFACE field represents encoding for an expression (fine expression detection), and FIG. 17 may be referred to. FIG. 17 shows an example of an expression code calculation table.

When the faceFACE field value is 'A', Trace is represented according to FIG. 17.

Furthermore, the Date field represents the exposed time information.

That is, the AI device may generate output data 2 by analyzing information on input data 2 through the above learning procedure.

Furthermore, the AI device may learn the output data 1 and/or the output data 2 based on an LSTM algorithm to generate an event as presented in the present disclosure. In addition, the AI device may generate danger level information indicating a danger level for each of the output data 1 and the output data 2 based on the output data 1 and the output data 2.

The process of generating the event and the process of generating the danger level information may be performed by the AI device or may be performed by the control server.

When the event generation and the danger level information generation are performed by the control server, the AI device may transmit the output data 1 and the output data 2 to the control server, and the control server may transmit a message including the event and the danger level information to the AI device.

The relationship among the output data 1, the output data 2, the danger level, and the event (user's feedback result) may be predefined as shown in Table 2 below.

TABLE 2

| Output data 1 | Danger level | Output data 2 | Danger level | Event (Feedback result) |
|---|---|---|---|---|
| Face: DB identified visitors Object: Belongings (X) | Low | Face: Joy Action: Gladly open the front door | Low | Transmit door lock open alarm to user |
| Face: DB identified visitors Object: belongings (X) | Low | Face: Aversion Action: No response after checking face with intercom | High | Ignore intercom alarm transmission to user |
| Face: DB unidentified visitors Object: Belongings (food) | Medium | Face: Satisfaction Action: Gladly open the front door and proceed with credit card payment | Low | Transmit door lock open and non-face-to-face payment related alarm |

TABLE 2-continued

| Output data 1 | Danger level | Output data 2 | Danger level | Event (Feedback result) |
|---|---|---|---|---|
| Face: DB unidentified visitors Object: Belongings (weapon) | High | Face: Fear Action: Check face with phone and report police | High | Transmit emergency call connection guidance alarm |
| . . . | . . . | . . . | . . . | . . . |
| Danger level measurement through Face/Object/Voice | Transmit calculation result to server | Level measurement through Face/Action/Frequency | Transmit calculation result to server | Output of result transmitted in the server and action appropriate to situation |

FIG. 18 is a flowchart showing an example of a method for operating a doorbell device for generating an event depending on a visitor presented in the present disclosure.

First, the doorbell device receives first input data related to the visitor including at least one of video or audio of the visitor (S1801).

Then, the doorbell device learns the first input data based on at least one first learning algorithm to generate first output data related to the event (S1802).

The first output data may include at least one of face information, body feature information, clothing information, or belongings information, of the visitor.

In the face information of the visitor, a face region of the visitor may be detected from the video of the visitor based on the deep neural network (DNN) algorithm, and a face of the visitor may be recognized from the detected face region based on the Res Net algorithm.

The body feature information of the visitor is learned based on at least one of the Mel frequency cepstral coefficient (MFCC) algorithm, the linear predictive coding (LPC) algorithm, or the long short-term memory (LSTM) algorithm.

The belongings information of the visitor may be learned based on the you-only-look-once (Yolo) algorithm.

Then, the doorbell device transmits the first input data to the user terminal (S1803).

Then, the doorbell device may receive second input data related to the user's feedback on the first input data from the user terminal (S1804).

Then, the doorbell device learns the second input data based on at least one second learning algorithm to generate second output data related to the event (S1805).

The second output data may include facial expression information of the user.

The facial expression information of the user may be generated as JSON data obtained by data-converting a human facial expression into numbers and alphabets.

Then, the doorbell device checks a danger level for the visitor based on at least one of the first output data or the second output data (S1806).

The danger level may be low, medium, or high.

The event may be doorbell ignore, door unlock, emergency call connection, or non-face-to-face payment module activation.

Then, the doorbell device generates the event based on the danger level (S1807).

FIG. 19 is a flowchart showing another example of a method for operating a doorbell device for generating an event depending on a visitor presented in the present disclosure.

First, the doorbell device receives first input data related to the visitor including at least one of video or audio of the visitor (S1901).

Then, the doorbell device learns the first input data based on at least one first learning algorithm to generate first output data related to the event (S1902).

The first output data may include at least one of face information, body feature information, clothing information, or belongings information, of the visitor.

The second output data may include at least one of facial expression information, voice information, and behavior information, of the user.

Then, the doorbell device performs an initial access procedure with a server for downlink synchronization and reception of system information, and perform a random access procedure with the server for uplink synchronization (S1903).

The initial access procedure may be performed by a synchronization signal block including a first synchronization signal, a second synchronization signal, and a broadcast channel, the synchronization signal block may include four consecutive OFDM symbols, the first synchronization signal, the broadcast channel, and the second synchronization signal are transmitted for each OFDM symbol, each of the first synchronization signal and the second synchronization signal may include one OFDM symbol and 127 subcarriers, and the broadcast channel may include three OFDM symbols and 576 subcarriers.

The random access procedure may include transmitting a random access preamble sequence to the server and receiving a random access response message from the server.

The random access preamble sequence may include a long sequence and a short sequence having different lengths, and the length of the long sequence may be 839, and the length of the short sequence may be 139.

Then, the doorbell device receives a uplink grant from the server through the physical control channel in order to transmit the first input data (S1904). Then, the doorbell device transmits the first input data to the user terminal through an uplink physical shared channel based on the uplink grant (S1904).

Then, the doorbell device receives a downlink grant from the server through the physical control channel in order to receive second input data related to the user's feedback on the first input data (S1905). Then, the doorbell device receives the second input data from the user terminal through the downlink physical sharing channel based on the downlink grant (S1905).

Then, the doorbell device learns the second input data based on at least one second learning algorithm to generate second output data related to the event (S1906).

Then, the doorbell device generates the event based on the first output data or the second output data (S1907).

FIG. 20 is a flowchart showing yet another example of a method for operating a doorbell device for generating an event depending on a visitor presented in the present disclosure.

First, the doorbell device receives first input data related to the visitor including at least one of video or audio of the visitor (S2001).

Then, the doorbell device learns the first input data based on at least one first learning algorithm to generate first output data related to the event (S2002).

The first output data may include at least one of face information, body feature information, clothing information, or belongings information, of the visitor.

In the face information of the visitor, a face region of the visitor may be detected from the video of the visitor based on the deep neural network (DNN) algorithm, and a face of the visitor may be recognized from the detected face region based on the Res Net algorithm.

The body feature information of the visitor is learned based on at least one of the Mel frequency cepstral coefficient (MFCC) algorithm, the linear predictive coding (LPC) algorithm, or the long short-term memory (LSTM) algorithm.

The belongings information of the visitor may be learned based on the you-only-look-once (Yolo) algorithm.

Then, the doorbell device transmits the first input data to the user terminal (S2003).

Then, the doorbell device receives second input data related to the user's feedback on the first input data from the user terminal (S2003).

Then, the doorbell device learns the second input data based on at least one second learning algorithm to generate second output data related to the event (S2004).

The second output data may include facial expression information of the user.

the facial expression information of the user may be generated as JSON data obtained by data-converting a human facial expression into numbers and alphabets.

Then, the doorbell device receives the uplink grant from the server through the physical control channel (S2005). Then, the doorbell device transmits the first output data and the second output data to the server through the uplink physical shared channel based on the uplink grant (S2005).

Then, the doorbell device receives a downlink grant from the server through the physical control channel (S2006). In addition, the doorbell device receives danger level information indicating a danger level for the visitor through the downlink physical sharing channel based on the downlink grant (S2006).

Then, the doorbell device generates the event based on the danger level (S2007).

The term "unit" (e.g., a control unit) as used herein may mean, for example, a unit including one or a combination of two or more of hardware, software, or firmware. "Unit" may be used interchangeably with terms such as section, logic, logical block, component, or circuit. The "unit" may be a minimum unit or a portion of an integrally formed part. The "unit" may be a minimum unit or a portion of one or more functions. The "unit" may be implemented mechanically or electronically. For example, "unit" may include at least one of an application-specific integrated circuit (ASIC) chip, a field-programmable gate array (FPGA), or a programmable-logic device that performs certain operations, which has been known, or will be developed in the future.

At least a portion of a device (e.g., modules or their functions) or a method (e.g., operations) in accordance with various exemplary embodiments may be implemented, for example, as instructions stored in the form of a program module in a computer-readable storage medium. When the instructions are executed by a processor, one or more processors may perform functions corresponding to the instructions. The computer-readable storage medium may be, for example, a memory.

The computer-readable storage media may include hard disks, floppy disks, magnetic media (e.g., magnetic tape), optical media (e.g., compact disc read-only memory (CD-ROM)), digital versatile discs (DVDs), magneto-optical media (e.g., floppy disk), hardware device (e.g., read-only memory (ROM), random-access memory (RAM), or flash memory), or the like. Further, instructions of the program may include not only machine language codes such as those produced by a compiler, but also high-level language codes that can be executed by a computer using an interpreter or the like. The above-described hardware device may be configured to operate as one or more software modules to perform operations of various exemplary embodiments, and vice versa.

A module or program module in accordance with various exemplary embodiments may include at least one or more of the above-described components, omit some of the above-described components, or further include additional other components. Operations performed by a module, a program module, or other components in accordance with various exemplary embodiments may be executed sequentially, in parallel, repeatedly, or in a heuristic manner. Further, some operations may be executed in a different order, omitted, or other operations may be added.

In accordance with the exemplary embodiments disclosed in the present specification, there is an effect that the doorbell camera system may generate a corresponding event by learning a user's feedback on a visitor by the doorbell camera system itself.

In addition, in accordance with the exemplary embodiments disclosed in the present specification, there is an effect that the user may deal with a request of the visitor in a non-face-to-face (untact) state.

In addition, in accordance with the exemplary embodiments disclosed in the present specification, there is an effect that the doorbell camera system may allow the user to block a visitor or take safety measures without checking the visitor that is threatening to the user.

In addition, in accordance with the exemplary embodiments disclosed in the present specification, there is an effect that the doorbell camera system may increase user convenience by learning repeated user behavior patterns for a specific visitor and automatically responding to the pattern.

Meanwhile, the effects obtainable from the present disclosure are not limited to the effects mentioned above, and other effects not mentioned can be clearly understood by those skilled in the art from the following description.

In the above, preferred exemplary embodiments of the technology of the present disclosure have been described with reference to the accompanying drawings. Here, it should be understood that the terms or words used in the present specification and appended claims should not be construed as being limited to general or dictionary meanings, but interpreted based on meanings and concepts corresponding to the technical aspects of the present disclosure.

The scope of the present disclosure is not limited to the exemplary embodiments disclosed in the present disclosure, and various modifications, changes, or improvement can be made to the present disclosure without departing from the spirit and scope of the present disclosure.

What is claimed is:

1. A doorbell device for generating an event for a visitor at a doorbell camera system, comprising:
   a transceiver configured to transceive a wireless signal through an antenna; and
   a processor functionally connected to the transceiver and configured to:
   receive first input data related to the visitor including at least one of video or audio of the visitor;
   transmit the first input data to a user terminal and receive second input data related to a user's feedback on the first input data from the user terminal;
   learn the first input data based on at least one first learning algorithm to generate first output data related to the event, and learn the second input data based on at least one second learning algorithm to generate second output data related to the event; and
   determine a danger level for the visitor based on at least one of the first output data or the second output data, and generate the event based on the danger level,
   wherein the second output data comprises facial expression information of the user, and
   wherein the facial expression information of the user is generated as JSON data obtained by data-converting a human facial expression into numbers and alphabets.

2. The doorbell device of claim 1, wherein the first output data comprises at least one of face information, body feature information, clothing information, and belongings information, of the visitor.

3. The doorbell device of claim 2, wherein in the face information of the visitor, a face region of the visitor is detected from the first input data based on a deep neural network (DNN) algorithm, and a face of the visitor is recognized from the detected face region based on a Res Net algorithm.

4. The doorbell device of claim 2, wherein the body feature information of the visitor is learned based on at least one of a Mel frequency cepstral coefficient (MFCC) algorithm, a linear predictive coding (LPC) algorithm, or a long short-term memory (LSTM) algorithm.

5. The doorbell device of claim 2, wherein the belongings information of the visitor is learned based on a you-only-look-once (Yolo) algorithm.

6. The doorbell device of claim 1, wherein the danger level is low, medium, or high.

7. The doorbell device of claim 1, wherein the event is doorbell ignore, door unlock, emergency call connection, or non-face-to-face payment module activation.

8. A doorbell device for generating an event for a visitor at a doorbell camera system, comprising:
   a transceiver configured to transceive a wireless signal through an antenna; and
   a processor functionally connected to the transceiver and configured to:
   receive first input data related to the visitor including at least one of video or audio of the visitor;
   learn the first input data based on at least one first learning algorithm to generate first output data related to the event, and learn second input data based on at least one second learning algorithm to generate second output data related to the event;
   perform an initial access procedure with a server for downlink synchronization and reception of system information, and perform a random access procedure with the server for uplink synchronization,
   wherein the initial access procedure is performed by a synchronization signal block including a first synchronization signal, a second synchronization signal, and a broadcast channel,
   wherein the synchronization signal block includes four consecutive OFDM symbols, and the first synchronization signal, the broadcast channel, and the second synchronization signal are transmitted for each OFDM symbol,
   wherein each of the first synchronization signal and the second synchronization signal includes one OFDM symbol and 127 subcarriers, and
   wherein the broadcast channel includes three OFDM symbols and 576 subcarriers;
   receive an uplink grant from the server, transmit the first input data to the user terminal based on the uplink grant, receive a downlink grant from the server, and receive the second input data related to the user's feedback on the first input data from the user terminal based on the downlink grant; and
   generate the event based on the first output data or the second output data.

9. The doorbell device of claim 8, wherein the first output data comprises at least one of face information, body feature information, clothing information, and belongings information, of the visitor.

10. The doorbell device of claim 8, wherein the second output data comprises at least one of facial expression information, voice information, and behavior information of the user.

11. The doorbell device of claim 9, wherein the processor is configured to perform the random access procedure by transmitting a random access preamble sequence to the server and receiving a random access response message from the server.

12. The doorbell device of claim 11, wherein the random access preamble sequence comprises a long sequence and a short sequence having different lengths, and
   the length of the long sequence is 839, and the length of the short sequence is 139.

13. A doorbell device for generating an event for a visitor at a doorbell camera system, comprising:
   a transceiver configured to transceive a wireless signal through an antenna; and
   a processor functionally connected to the transceiver and configured to:
   receive first input data related to the visitor including at least one of video or audio of the visitor;
   learn the first input data based on at least one first learning algorithm to generate first output data related to the event, and learn second input data based on at least one second learning algorithm to generate second output data related to the event;
   perform an initial access procedure with a server for downlink synchronization and reception of system information, and perform a random access procedure with the server for uplink synchronization,
   wherein the initial access procedure is performed by a synchronization signal block including a first synchronization signal, a second synchronization signal, and a broadcast channel,
   wherein the synchronization signal block includes four consecutive OFDM symbols, and the first synchronization signal, the broadcast channel, and the second synchronization signal are transmitted for each OFDM symbol,
wherein each of the first synchronization signal and the second synchronization signal includes one OFDM symbol and 127 subcarriers, and
wherein the broadcast channel includes three OFDM symbols and 576 subcarriers;
transmit the first input data to a user terminal, receive second input data related to a user's feedback on the first input data from the user terminal, receive an uplink grant and a downlink grant from the server, transmit the first output data and the second output data to the server based on the uplink grant, and receive danger level information indicating a danger level for the visitor from the server based on the downlink grant; and
generate the event based on the danger level.

14. The doorbell device of claim 13, wherein the first output data comprises at least one of face information, body feature information, clothing information, and belongings information, of the visitor.

15. The doorbell device of claim 13, wherein the second output data comprises at least one of facial expression information, voice information, and behavior information of the user.

16. The doorbell device of claim 13, wherein the danger level is low, medium, or high, and the event is doorbell ignore, door unlock, emergency call connection, or non-face-to-face payment module activation.

* * * * *